United States Patent
Yang

(10) Patent No.: US 8,744,264 B2
(45) Date of Patent: Jun. 3, 2014

(54) OPTICAL RELAYING R-TYPE AND GR-TYPE RECEIVER SYSTEM

(75) Inventor: Jong Suk Yang, Seoul (KR)

(73) Assignee: Hyundai Infracore Co., Ltd., Seoul (KR)

( * ) Notice: Subject to any disclaimer, the term of this patent is extended or adjusted under 35 U.S.C. 154(b) by 65 days.

(21) Appl. No.: 13/258,752

(22) PCT Filed: Apr. 8, 2010

(86) PCT No.: PCT/KR2010/002172
§ 371 (c)(1),
(2), (4) Date: Sep. 22, 2011

(87) PCT Pub. No.: WO2011/062330
PCT Pub. Date: May 26, 2011

(65) Prior Publication Data
US 2012/0033977 A1  Feb. 9, 2012

(30) Foreign Application Priority Data

Nov. 18, 2009 (KR) .................. 10-2009-0111246
Nov. 18, 2009 (KR) .................. 10-2009-0111252
Jan. 20, 2010 (KR) .................. 10-2010-0005074

(51) Int. Cl.
*H04B 10/00* (2013.01)
(52) U.S. Cl.
USPC ............................. 398/73; 398/115
(58) Field of Classification Search
USPC .................. 398/66–73, 115–117
See application file for complete search history.

(56) References Cited

U.S. PATENT DOCUMENTS

| | | | | |
|---|---|---|---|---|
| 3,805,066 A | * | 4/1974 | Chijuma et al. | 250/227.11 |
| 4,379,289 A | * | 4/1983 | Peek | 340/555 |
| 5,064,271 A | * | 11/1991 | Kern et al. | 385/33 |
| 5,416,781 A | * | 5/1995 | Ruiz | 370/524 |
| 5,754,103 A | * | 5/1998 | Kanai et al. | 340/507 |
| 6,115,713 A | * | 9/2000 | Pascucci et al. | 1/1 |
| 6,181,841 B1 | * | 1/2001 | Hodge | 385/12 |
| 6,418,260 B1 | * | 7/2002 | Komachiya et al. | 385/128 |
| 6,647,161 B1 | * | 11/2003 | Hodge | 385/12 |
| 6,876,786 B2 | * | 4/2005 | Chliaguine et al. | 385/13 |
| 6,960,987 B2 | * | 11/2005 | Dohi et al. | 340/286.05 |
| 7,110,424 B2 | * | 9/2006 | Barnes et al. | 370/539 |
| 7,406,401 B2 | * | 7/2008 | Ota et al. | 702/188 |
| 7,570,672 B2 | * | 8/2009 | Farley et al. | 370/535 |

(Continued)

FOREIGN PATENT DOCUMENTS

| | | |
|---|---|---|
| JP | 2007-317046 | 12/2007 |
| KR | 10-2004-0087995 | 10/2004 |
| KR | 10-2009-0051889 | 5/2009 |

*Primary Examiner* — Agustin Bello
(74) *Attorney, Agent, or Firm* — Lexyoume IP Meister, PLLC

(57) ABSTRACT

Some embodiments of R/GR type fire alarm control system according to the invention comprises a plurality of detectors/transmitters for issuing alarm signals, a plurality of fire safety equipments for operating under control signals, a plurality of optical repeaters and an R/GR type fire alarm control panel. The optical repeaters are connected to each other in daisy-chain and connected to the plurality of the detectors/transmitters and the fire safety equipments, optically transmits the alarm signals upwardly and optically transmits the control signals downwardly, and are capable of electrically transacting the alarm signals with respect to the detectors/transmitters and the control signals with respect to the fire safety equipments. The R/GR type fire alarm control panel receives the alarm signals from one of the optical repeaters and transmits the control signals to one of the optical repeaters.

15 Claims, 11 Drawing Sheets

(56) References Cited

U.S. PATENT DOCUMENTS

| | | |
|---|---|---|
| 7,649,450 B2 * | 1/2010 | Campion et al. .............. 340/514 |
| 7,657,330 B2 * | 2/2010 | Morrison ........................ 700/19 |
| 7,945,157 B2 * | 5/2011 | Jestel et al. ....................... 398/3 |
| 8,107,785 B2 * | 1/2012 | Berglund et al. ............. 385/135 |
| 8,144,736 B2 * | 3/2012 | Farley et al. .................. 370/535 |
| 2004/0052450 A1 * | 3/2004 | Morrison ........................ 385/24 |
| 2005/0058451 A1 * | 3/2005 | Ross ............................... 398/70 |
| 2009/0010657 A1 * | 1/2009 | Kazutaka ...................... 398/173 |
| 2009/0072981 A1 * | 3/2009 | Powell .......................... 340/628 |
| 2009/0263128 A1 * | 10/2009 | Farley et al. .................... 398/45 |
| 2010/0002983 A1 * | 1/2010 | Kopp et al. ..................... 385/13 |
| 2010/0290787 A1 * | 11/2010 | Cox ............................... 398/115 |
| 2012/0033977 A1 * | 2/2012 | Yang ............................. 398/115 |
| 2012/0148231 A1 * | 6/2012 | Farley et al. .................... 398/22 |

\* cited by examiner

OPTICAL RELAYING R-TYPE AND GR-TYPE RECEIVER SYSTEM

CROSS REFERENCE TO PRIOR APPLICATIONS

This application is a National Stage Patent application of PCT International Patent Application No. PCT/KR2010/002172 (filed on Apr. 8, 2010) under 35 U.S.C. §371, which claims priority to Korean Patent Application Nos. 10-2009-0111246 (filed on Nov. 18, 2009), 10-2009-0111252 (filed on Nov. 18, 2009) and 10-2010-0005074 (filed on Jan. 20, 2010), which are all hereby incorporated by reference in their entirety.

TECHNICAL FIELD

The present invention relates to a fire alarm control system. More particularly, the present invention R type and GR type fire alarm control systems.

BACKGROUND ART

National Fire Safety Criterion (NFSC) in Korea is regulations which prescribe various specifications with regard to fire safety facilities. For example, NFSC rule 203 fire safety standard for automated fire detection facilities regulates mandatory conditions for an automated fire detection facility of a building.

According to NFSC rule 203, a detector is defined as a device capable of detecting fire by itself to send alarm to a control panel, and a transmitter is defined as a device for a person who recognizes a fire to report. P type class 1 transmitter, among various transmitters, has a push button and a lamp for the person who activates it to ascertain its operation, with telephone circuitry between the transmitter and the fire alarm control panel, while P type class 2 transmitter has a push button without telephone function. Fire alarm control panels are classified as P type, R type, M type, GP type, GR type. R type and GR type control panels are capable of receiving respective alarm signals from a plurality of detectors or transmitters (for more than 100 pieces of repeaters), which are equivalent of more than 100 repeaters, and of notifying the concerned authorities. R type and GR type control panels are needed to easily identify installed location of the activated detectors or transmitters, therefore each of detectors or transmitters may have its own identifier. For a large scale building or complex, it is irrational to directly connect thousands of detectors or transmitters to a central fire alarm control panel, such that the regulation requires a repeater to receive alarm signals (including identifiers) from each of detectors or transmitters then to relay the alarm signals to the fire alarm control panel or another repeater.

Repeater is a device which delivers signals caused by activation of a detector or a transmitter to a fire alarm control panel, and control signals for smoke ventilation system or varying fire extinguishing facilities. Thus, repeaters necessarily have input channel from a fire alarm control panel and output channel to the fire alarm control panel.

Conventional R type and GR type fire alarm control system utilizes RS 485 or RS 422 specification for connecting several repeaters to an R/GR type fire alarm control panel. RS 485/422 specification may provide differential communication network, within 1 km length more or less, for up to 127 or 255 repeaters in case of multi-drop connections. Generally, one R/GR type fire alarm control system may cover one moderate building. But, conventional R/GR type fire alarm control system is not suitable to construct an integrated fire control system for a residence complex or a college campus, as well as a skyscraper.

Actually, fire surveillance systems constructed with RS485/422 wiring suffer frequent false alarms and malfunctions, causing janitors of the buildings to turn off and neglect the surveillance systems. Owing to habitual constructions of poorly performing fire surveillance system, the system is practically considered as a formal requirement to get a permit on the completion of a building.

DISCLOSURE

Technical Problem

The present invention may provide a novel R/GR type fire alarm control system overcoming limitations of communication length and the number of repeaters to be connected in conventional R/GR type fire alarm control system.

Furthermore, the present invention may provide more reliable R/GR type fire alarm control system issuing much less false alarms.

Technical Solution

Example embodiments of the present invention provide an optical signal converter, connecting between multiple detectors/transmitters or fire safety equipments and an R/GR type fire alarm control panel such that the optical signal converters be coupled in daisy-chain, the optical signal converter comprising:

an upstream signal path for electrically combining an electric signal, electrically converted from an optical signal optically received from a next optical converter connected in daisy-chain, and an alarm signal, originated from at least one of the multiple detectors/transmitters, so as to output a optical signal optically converted from the electrically combined signal;

a downstream signal path for electrically converting an optical signal optically received from a previous optical converter connected in daisy-chain, and then for optically reconverting the electrically converted signal so as to output the optical signal; and an I/O port for providing the alarm signal received from at least one of the multiple detectors/transmitters to the upstream signal path and for externally outputting the electrically converted signal from the downstream signal path, wherein the optical signal passing through the upstream signal path is eventually destined to the R/GR type fire alarm control panel through the daisy-chain, and wherein the optical signal passing through the downstream signal path is originated from the R/GR type fire alarm control panel.

Advantageously, the upstream signal path comprises:

a first optical input port for producing the electric signal electrically converted from the optical signal from the next optical signal converter connected in daisy-chain;

an upstream branch for combining the electric signal from the first optical input port and the alarm signal originated from the detectors/transmitters, so as to produce the electrically combined signal; and a first optical output port for producing the optical signal optically converted from the electrically combined signal from the upstream branch.

Advantageously, the upstream branch comprises a wire tap coupling an output conductive line of the first optical input port and a conductive line carrying the alarm signal from the I/O port.

Advantageously, the upstream branch comprises an adjustment circuit for delaying one of the electric signal from the first optical input port and the alarm signal from the detectors/transmitters when those two signals arrive simultaneously, so as to sequentially output those two signals.

Advantageously, the upstream branch comprises a packet encoder for encoding a combined packet when the electric signal from the first optical input port and the alarm signal from the detectors/transmitters arrive simultaneously.

Advantageously, the I/O port comprises:

an input port for receiving a differential alarm signal satisfying RS485 or RS422 specification or a DC 24 V alarm signal from the detectors/transmitters, and for converting to a single-ended alarm signal to be provided to the upstream signal path; and an output port for converting the electrically converted signal from the downstream signal path to a differential signal satisfying RS485 or RS422 specification or a DC 24 V signal to be output externally.

Advantageously, the downstream signal path comprises:

a second optical input port for producing the electrically converted signal from the optical signal optically received from a previous optical converter connected in daisy-chain; and a downstream branch for forking the electrically converted signal from the second optical input port to the I/O port and a second optical output port, wherein the second optical output port optically converts the electrically converted signal from the downstream branch to be output externally.

Advantageously, the downstream branch comprises a wire tap coupling an output conductive line of the second optical input port and a conductive line to the I/O port.

Advantageously, the downstream branch comprises a detection circuit for detecting a control signal in the electrically converted signal from the second optical input port to be transmitted to one of the fire safety equipments, and for outputting the control signal to the I/O port.

Further example embodiments of the present invention provide an optical signal repeater, connecting between multiple detectors/transmitters or fire safety equipments and an R/GR type fire alarm control panel with optical cables in daisy-chain, comprising:

an upstream signal path for electrically combining an electric signal, electrically converted from an optical signal optically received from a next optical converter connected in daisy-chain, and an alarm signal, originated from at least one of the multiple detectors/transmitters, so as to output a optical signal optically converted from the electrically combined signal;

a downstream signal path for electrically converting an optical signal optically received from a previous optical converter connected in daisy-chain, and then for optically reconverting the electrically converted signal so as to output the optical signal; and a repeating controller for providing the alarm signal from an I/O port to the upstream signal path and for extracting a control signal in the electric signal from the downstream signal path to be transmitted to the I/O port, wherein the I/O port provides the alarm signal received from at least one of the multiple detectors/transmitters to the upstream signal path and for externally outputting the control signal to corresponding fire safety equipments, and wherein the optical signal passing through the upstream signal path is eventually destined to the R/GR type fire alarm control panel through the daisy-chain, and wherein the optical signal passing through the downstream signal path is originated from the R/GR type fire alarm control panel.

In example embodiment, the upstream signal path comprises:

a first optical input port for producing the electric signal electrically converted from the optical signal from the next optical signal converter connected in daisy-chain;

an upstream branch for combining the electric signal from the first optical input port and the alarm signal originated from the detectors/transmitters, so as to produce the electrically combined signal; and a first optical output port for producing the optical signal optically converted from the electrically combined signal from the upstream branch.

In example embodiment, the upstream branch comprises a wire tap coupling an output conductive line of the first optical input port and a conductive line carrying the alarm signal from the I/O port.

In example embodiment, the upstream branch carries the electric signal from the first optical input port to the repeating controller and carries the electric signal, which is combined with the alarm signal from the repeating controller, to the first optical output port.

In example embodiment, the upstream branch comprises an adjustment circuit for delaying one of the electric signal from the first optical input port and the alarm signal from the detectors/transmitters when those two signals arrive simultaneously, so as to sequentially output those two signals.

In example embodiment, the upstream branch comprises a packet encoder for encoding a combined packet when the electric signal from the first optical input port and the alarm signal from the detectors/transmitters arrive simultaneously.

In example embodiment, the downstream signal path comprises:

a second optical input port for producing the electrically converted signal from the optical signal optically received from a previous optical converter connected in daisy-chain; and a downstream branch for forking the electrically converted signal from the second optical input port to the repeating controller and a second optical output port, wherein the second optical output port optically converts the electrically converted signal from the downstream branch to be output externally.

In example embodiment, the downstream branch comprises a wire tap coupling an output conductive line of the second optical input port and a conductive line to the repeating controller.

In example embodiment, the downstream branch comprises a detection circuit for detecting a control signal in the electrically converted signal from the second optical input port to be transmitted to one of the fire safety equipments, and for outputting the control signal to the repeating controller.

Further example embodiments of the present invention provide an R/GR type fire alarm control system comprising:

a plurality of detectors/transmitters for issuing alarm signals;

a plurality of fire safety equipments for operating under control signals;

a plurality of repeaters connected to the plurality of detectors/transmitters and the plurality of fire safety equipments;

a plurality of optical converts, connected to each other in daisy-chain, for optically transmitting the alarm signals upwardly and optically transmitting the control signals downwardly, and capable of electrically transacting the alarm signals and the control signals with respect to the plurality of the repeaters; and an R/GR type fire alarm control panel for receiving the alarm signals from one of the optical converters and for transmitting the control signals to one of the optical converters.

In example embodiment, the R/GR type fire alarm control panel system further comprises a single port optical converter optically coupled to the one of the optical converters and electrically coupled to the R/GR type fire alarm control panel.

Another example embodiment of the present invention provides an R/GR type fire alarm control system comprising:

a plurality of detectors/transmitters for issuing alarm signals;

a plurality of fire safety equipments for operating under control signals;

a plurality of optical repeaters, connected to each other in daisy-chain and connected to the plurality of the detectors/transmitters and the fire safety equipments, for optically transmitting the alarm signals upwardly and optically transmitting the control signals downwardly, and capable of electrically transacting the alarm signals with respect to the detectors/transmitters and the control signals with respect to the fire safety equipments; and an R/GR type fire alarm control panel for receiving the alarm signals from one of the optical repeaters and for transmitting the control signals to one of the optical repeaters.

In example embodiment, the R/GR type fire alarm control panel system further comprises a single port optical converter optically coupled to the one of the optical repeaters and electrically coupled to the R/GR type fire alarm control panel.

Yet another example embodiment of the present invention provides a 3-way optical repeater, connecting between multiple detectors/transmitters or fire safety equipments and an R/GR type fire alarm control panel with optical cables in daisy-chain, comprising:

an upstream signal path for optically receiving a first upstream signal, which is eventually destined to the R/GR type fire alarm control panel, electrically converting the first upstream signal, electrically combining the converted first upstream signal with an alarm signal originated from at least one of the detectors/transmitters to yield a second upstream signal, and optically outputting the second upstream signal;

a downstream signal path for optically receiving a first downstream signal, which, originating from the R/GR type fire alarm control panel, is eventually destined to the at least one of the fire safety equipments, electrically converting the first downstream signal, extracting a control signal for the at least one of the fire safety equipments, and for optically outputting the first downstream signal after the extraction; and an optical I/O port for electrically converting an alarm signal, which, originating at the detectors/transmitters, is optically provided, to be provided to the upstream signal path, and for optically outputting the control signal extracted at the downstream signal path.

In example embodiment, the upstream signal path comprises:

a first optical input port for producing a first upstream electric signal electrically converted from the first upstream signal, which is optically received from a next 3-way optical repeater connected in daisy-chain;

an upstream branch for combining the first upstream electric signal from the first optical input port and the alarm signal originated from the detectors/transmitters, so as to produce the second upstream electric signal; and a first optical output port for producing the second upstream signal optically converted from the second upstream electric signal outputted from the upstream branch.

In example embodiment, the upstream branch comprises a wire tap coupling an output conductive line of the first optical input port and a conductive line carrying the alarm signal on from the optical I/O port.

In example embodiment, the upstream branch comprises an adjustment circuit for delaying one of the first upstream electric signal from the first optical input port and the alarm signal from the detectors/transmitters when those two signals arrive simultaneously, so as to sequentially output those two signals.

In example embodiment, the upstream branch comprises a packet encoder for encoding a combined packet when the first upstream electric signal from the first optical input port and the alarm signal from the detectors/transmitters arrive simultaneously.

In example embodiment, the downstream signal path comprises:

a second optical input port for producing a first downstream electrical signal from the first downstream signal optically received from a previous 3-way optical repeater connected in daisy-chain; and a downstream branch for forking the first downstream electrical signal from the second optical input port to the optical I/O port and a second optical output port, wherein the second optical output port optically converts the first downstream electrical signal from the downstream branch to be output externally.

In example embodiment, the downstream branch comprises a wire tap coupling an output conductive line of the second optical input port and a conductive line to the optical I/O port.

In example embodiment, the downstream branch comprises a detection circuit for detecting a control signal in the first downstream electrical signal from the second optical input port to be transmitted to one of the fire safety equipments, and for outputting the control signal to the optical I/O port.

An embodiment of the present invention provides a 3-way optical repeater, connecting between multiple detectors/transmitters or fire safety equipments and an R/GR type fire alarm control panel with optical cables in daisy-chain, comprising:

a first optical input port for optically receiving a first signal from a first 3-way optical repeater connected in daisy-chain;

a first optical output port for optically outputting a second signal to a second 3-way optical repeater connected in daisy-chain;

a second optical input port for optically receiving a third signal from the second 3-way optical repeater;

a second optical output port for optically outputting a fourth signal to the first 3-way optical repeater;

a third optical input port for optically receiving an alarm signal eventually destined to the R/GR type fire alarm control panel;

a third optical output port for optically outputting a control signal eventually destined to one of the fire safety equipments; and a relaying part for electrically receiving the first signal and the alarm signal, which are optically received from respectively the first optical input port and the third optical input port and electrically converted, so as to electrically produce the second signal to be provided to the first optical output port, for electrically receiving the third signal, which is optically received from the second optical input port and is electrically converted, so as to extract the control signal from the third signal to provided to the third optical output port, and for producing the fourth signal, based on the third signal, to the second optical output port, so as to deliver the fourth signal to the first 3-way optical repeater.

Another embodiment of the present invention provides an R/GR type fire alarm control system comprising:

a plurality of detectors/transmitters for issuing alarm signals;

a plurality of fire safety equipments for operating under control signals;

a plurality of 3-way optical repeaters, connected to each other in daisy chain through optical cables, for optically transmitting the alarm signals upwardly and for optically transmitting the control signals downwardly;

a plurality of 2-way optical repeaters, connected to the respective 3-way optical repeater and connected to the each other in daisy-chain through optical cables, among the plurality of detectors/transmitters or the plurality of fire safety equipments, for optically transmitting the alarm signals to a correspondingly connected 3-way optical repeater, and for optically transmitting the control signals to a correspondingly connected 3-way optical repeater; and an R/GR type fire alarm control panel for electrically or optically receiving the alarm signals from one of the 3-way optical repeaters and for electrically or optically transmitting the control signals to one of the 3-way optical repeaters.

In example embodiment, the R/GR type fire alarm control panel system further comprises a single port optical converter optically coupled to the one of the 3-way optical repeaters and electrically coupled to the R/GR type fire alarm control panel.

Yet another embodiment of the invention provides an optical signal converter, connecting between multiple detectors/transmitters or fire safety equipments and an R/GR type fire alarm control panel in daisy-chain using optical cables, the optical signal converter comprising:

a first optical module for receiving an upstream optical signal from a next optical signal converter connected in daisy-chain to be converted into an upstream electric signal, for receiving a downstream electric signal to be converted into a downstream optical signal, and for outputting the downstream optical signal to the next optical signal converter;

a second optical module for receiving the downstream optical signal from a previous optical signal converter connected in daisy-chain to be converted into the downstream electric signal, for receiving a combined upstream electric signal to be converted into a combined upstream optical signal, and for outputting the combined upstream optical signal to the previous optical signal converter;

a upstream branch for electrically combining the upstream electric signal from the first optical module and the alarm signal originated from the detectors/transmitters, so as to produce the combined upstream electric signal; and a downstream branch for providing the downstream electric signal from the second optical module to an I/O port and the first optical module, wherein the I/O port provides the alarm signal received from the detectors/transmitters to the upstream branch and for externally outputting the downstream electric signal.

In example embodiment, the upstream branch comprises a wire tap coupling an output conductive line of the first optical module and a conductive line carrying the alarm signal from the I/O port.

In example embodiment, the upstream branch comprises an adjustment circuit for delaying one of the upstream electric signal from the first optical module and the alarm signal from the detectors/transmitters when those two signals arrive simultaneously, so as to sequentially output those two signals.

In example embodiment, the upstream branch comprises a packet encoder for encoding a combined packet to be outputted as the combined upstream electric signal, when the upstream electric signal from the first optical module and the alarm signal from the detectors/transmitters arrive simultaneously.

In example embodiment, the I/O port comprises:

an input port for receiving a differential alarm signal satisfying RS485 or RS422 specification or a DC 24 V alarm signal, from the detectors/transmitters, and for converting to a single-ended alarm signal to be provided to the upstream branch; and an output port for converting the downstream electrical signal to a differential signal satisfying RS485 or RS422 specification or a DC 24 V signal to be output externally.

In example embodiment, the downstream branch comprises a wire tap coupling an output conductive line of the second optical module and a conductive line to the I/O port.

In example embodiment, the downstream branch comprises a detection circuit for detecting a control signal in the downstream electric signal from the second optical module to be transmitted to one of the fire safety equipments, and for outputting the control signal to the I/O port.

Further embodiments of the present invention provide an optical repeater, connecting between multiple detectors/transmitters or fire safety equipments and an R/GR type fire alarm control panel in daisy-chain using optical cables, comprising:

a first optical module for receiving an upstream optical signal from a next optical repeater connected in daisy-chain to be converted into an upstream electric signal, for receiving a downstream electric signal to be converted into a downstream optical signal, and for outputting the downstream optical signal to the next optical repeater;

a second optical module for receiving the downstream optical signal from a previous optical repeater connected in daisy-chain to be converted into the downstream electric signal, for receiving a combined upstream electric signal to be converted into a combined upstream optical signal, and for outputting the combined upstream optical signal to the previous optical repeater;

a upstream branch for electrically combining the upstream electric signal from the first optical module and the alarm signal originated from the detectors/transmitters, so as to produce the combined upstream electric signal;

a downstream branch for providing the downstream electric signal from the second optical module to a repeating controller and the first optical module; and a repeating controller for providing the received alarm signal to the upstream branch, and for extracting a control signal from the downstream electric signal; and an I/O port for providing the alarm signal received from the detectors/transmitters to the repeating controller, and for externally outputting the control signal provided from the repeating controller.

In example embodiments, the upstream branch delivers the upstream electric signal outputted from the first optical module to the repeating controller and delivers the combined upstream electric signal received from the repeating controller to the second optical module, and the repeating controller is configured to combine the alarm signal and the upstream electric signal to produce the combined upstream electric signal.

In example embodiments, the upstream branch comprises an adjustment circuit for delaying one of the upstream electric signal from the first optical module and the alarm signal from the detectors/transmitters when those two signals arrive simultaneously, so as to sequentially output those two signals.

In example embodiments, the upstream branch comprises a packet encoder for encoding a combined packet, when the upstream electric signal from the first optical module and the alarm signal from the detectors/transmitters arrive simultaneously.

In example embodiments, the downstream branch comprises a wire tap coupling an output conductive line of the second optical module and a conductive line to the repeating controller.

In example embodiments, the I/O port comprises:

an input port for receiving a differential alarm signal satisfying RS485 or RS422 specification or a DC 24 V alarm signal, from the detectors/transmitters, and for converting to a single-ended alarm signal to be provided to the repeating controller; and an output port for converting the control signal from the repeating controller into a differential signal satisfying RS485 or RS422 specification or a DC 24 V signal to be output externally.

Embodiments of the present invention may provide an optical repeater, connecting between multiple detectors/transmitters or fire safety equipments and an R/GR type fire alarm control panel in daisy-chain using optical cables, comprising:

a first optical module for receiving an upstream optical signal from a next optical converter connected in daisy-chain to be converted into an upstream electric signal, for receiving a downstream electric signal to be converted into a downstream optical signal, and for outputting the downstream optical signal to the next optical repeater;

a second optical module for receiving the downstream optical signal from a previous optical converter connected in daisy-chain to be converted into the downstream electric signal, for receiving a combined upstream electric signal to be converted into a combined upstream optical signal, and for outputting the combined upstream optical signal to the previous optical repeater;

a upstream branch for electrically combining the upstream electric signal from the first optical module and the alarm signal originated from the detectors/transmitters, so as to produce the combined upstream electric signal;

a downstream branch for providing the downstream electric signal from the second optical module to a repeating controller and the first optical module;

a repeating controller for providing the received alarm signal to the upstream branch, and for extracting a control signal from the downstream electric signal; and a third optical module for optically receiving the alarm signal originated from the detectors/transmitters, for electrically converting the alarm signal to be provided to the repeating controller, and for externally outputting the control signal provided from the repeating controller.

In example embodiments, the upstream branch comprises a wire tap coupling an output conductive line of the first optical module and a conductive line carrying the alarm signal from the repeating controller.

the upstream branch delivers the upstream electric signal outputted from the first optical module to the repeating controller and delivers the combined upstream electric signal received from the repeating controller to the second optical module, and In example embodiments, the repeating controller is configured to combine the alarm signal and the upstream electric signal to produce the combined upstream electric signal.

In example embodiments, the upstream branch comprises an adjustment circuit for delaying one of the upstream electric signal from the first optical module and the alarm signal from the detectors/transmitters when those two signals arrive simultaneously, so as to sequentially output those two signals.

In example embodiments, the upstream branch comprises a packet encoder for encoding a combined packet, when the upstream electric signal from the first optical module and the alarm signal from the detectors/transmitters arrive simultaneously.

In example embodiments, the downstream branch comprises a wire tap coupling an output conductive line of the second optical module and a conductive line to the repeating controller.

Advantageous Effects

According to the present invention, a novel R/GR type fire alarm control system may communicate farther and faster, and connect up to 65535 repeaters with integrity, such that a fire alarm control system can be constructed for an entire building, as well as for a complex or a skyscraper, with one R/GR type fire alarm control panel.

According to the present invention, a novel R/GR type fire alarm control system may expand affordable capacity using already installed detectors and transmitters.

Furthermore, according to embodiments of the present invention may provide reliable R/GR type fire alarm control system with much less error rate.

MODE FOR INVENTION

The invention is described more fully hereinafter with reference to the accompanying drawings, in which embodiments of the invention are shown. This invention may, however, be embodied in many different forms and should not be construed as limited to the embodiments set forth herein.

Rather, these embodiments are provided so that this disclosure will be thorough and complete, and will fully convey the scope of the invention to those skilled in the art.

Figure 1:
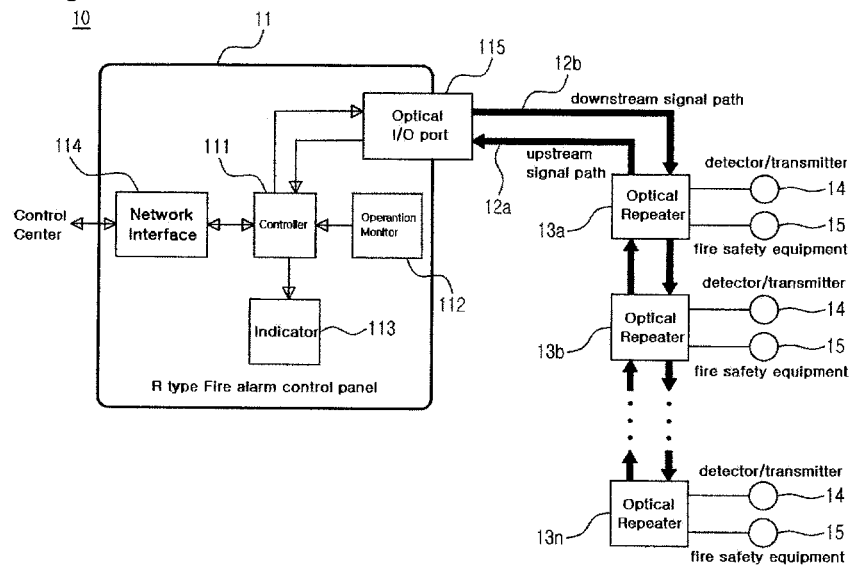
FIG. 1 is a block diagram illustrating an R/GR type optically repeating fire alarm control system according to an embodiment of the present invention.

FIG. 1 is a block diagram illustrating an R/GR type optically repeating fire alarm control system according to an embodiment of the present invention.

Referring to FIG. 1, an optically repeating R/GR type fire alarm control system 10 comprises an R/GR type fire alarm control panel 11, optical cables 12a and 12b, optical repeaters 13a, 13b through 13n, detectors/transmitters 14 and fire safety equipments 15. The optical repeaters 13a, 13b through 13n are connected in daisy-chain topology.

Specifically, the R/GR type fire alarm control panel 11 includes a controller 111, an operation monitor 112, an indicator 113, a network interface 114 and an optical I/O port 115. The controller 111 may control operations such as reception and regulation of alarm signals, identification of detectors or transmitters issuing alarm signals, communications with a control center, etc. The operation monitor 112 may monitor whether the repeaters and signal lines connected to the control panel are operational right. The indicator 113, including a display, LED lamps, or speakers, may visually or aurally indicate alarm status or operation status. The network interface 114 may perform communications to and from the control center. According to embodiments, a storage may be added to accumulate operational information within the storage.

The optical I/O port 115 of the R/GR type fire alarm control panel 11 receives a fire alarm issued at the detector/transmitter 14 through the optical cable 12a in a fashion of an optical signal, then converts the optical signal into an electric signal to be transmitted to the controller 111, as well as receiving a control signal from the controller 111, which is provided from the control center to each fire safety equipment, converting the control signal into an optical signal and transmitting the optical signal through the optical cable 12b.

A downstream signal path denotes a path propagating a control signal originated at the R/GR fire alarm control panel 11 via the respective optical repeaters 13 to corresponding fire safety equipments 15, while an upstream signal path in the repeater 13 may mean a path carrying an alarm signal issued in a detector/transmitter 14 through the respective optical repeater 13 to the R/GR type fire alarm control panel 11.

According to the embodiments, the R/GR type fire alarm control panel 11 may have an RS485 or RS422 I/O port, as a conventional one does. In such a case, the optical I/O port 115 may be embodied an additional item, such as a single port optical converter, which can be installed to the RS485/422 port from exterior of the R/GR control panel 11, converting an optical signal into an RS485/422 signal to be provided to the R/GR control panel 11, or converting an RS485/422 differential signal from the R/GR control panel 11 into an optical signal.

The optical cable 12a indicates a medium that may carry an alarm signal to the R/GR type fire alarm control panel 11, while the optical cable 12b indicates a medium that may transfer a control signal from the R/GR type fire alarm control panel 11.

Although in FIG. 1 the optical cables 12a, 12b are illustrated as physically separated cables, the cables 12a, 12b may be implemented with respective optical fibers placed within one optical cable.

The optical repeaters 13a, 13b through 13n are optically connected to each other with the optical cables 12a, 12b, and are electrically connected to more than one detector/transmitter 14, respectively. The detectors/transmitters 14 may be grouped by such as office sections or floors in a building, and each group of the detectors/transmitters 14 may be then wired by a simple DC line or an RS485/4222 wire for an optical repeater 13. The optical repeaters 13a, 13b through 13n may electrically connected to fire safety equipments 15 such as fire extinguishers, i.e. fire hydrants, sprinklers, or halogen extinguishers, or smoke ventilation system, i.e. dampers, fire doors, smoke shutters, smoke windows, evacuation guide light, etc.

The optical repeaters 13a, 13b through 13n are connected to each other in daisy-chain, deliver to an antecedent optical repeater 13 alarm signals, which are delivered from a following optical repeater 13, or issued at detectors/transmitters 14, selectively according to embodiments, or combining the alarm signals received. Furthermore, the optical repeaters 13a, 13b through 13n deliver control signals, which are transmitted from the R/GR type fire alarm control panel 11 or from an antecedent optical repeater 13, to fire safety equipments 15, to which the control signals are destined, or to a following optical repeater 13.

The optical repeaters 13a, 13b through 13n of the invention may be optically connected other optical repeaters 13, and be electrically connected to the detectors/transmitters 14 or fire safety equipments 15. Thus, the optical repeater 13 may convert received optical signals first into electrical signals, process the converted signal, and then convert the processed electric signals into optical signals to be output.

The detectors/transmitters 14 may be conventional detectors for fire, smoke, heat, or gas, or push-button call points (also known as transmitters) which are activated by a direct action of a man to issue an alarm. The detectors/transmitters may issue electric alarm signals and transmit the alarm signals to the optical repeaters 13. Commercially available detectors or transmitters may generally produce differential signal satisfying RS485/422 specifications. In these cases, the optical repeaters 13 may also equip with RS485/422 I/O ports and transact the alarm signals via the I/O ports. Other commercially available detectors or transmitters may produce alarm signals in DC 24 V single-ended signals. In this case, the optical repeaters 13 can equip with the DC I/O ports, through which the alarm signals may proceed.

According to the embodiments, the detectors/transmitters 14 may issue alarm signals optically, and be connected to the optical repeaters 13 with optical cables.

Figure 2:
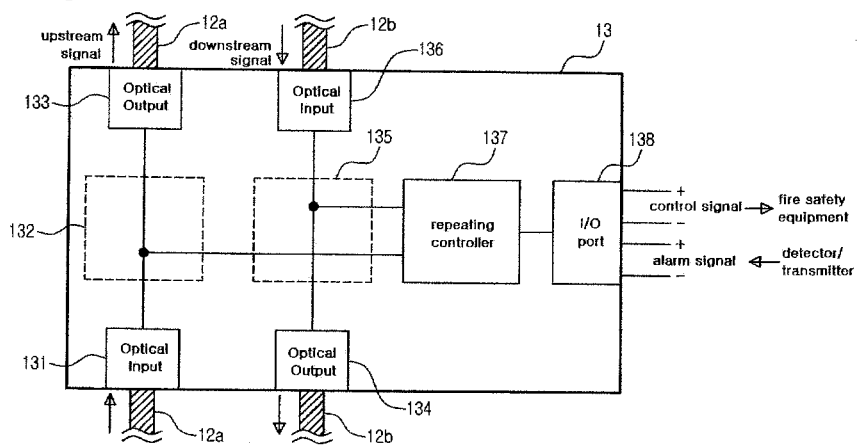
FIGS. 2 to 4 are block diagrams illustrating 2-way optical repeaters available for an R/GR type optically repeating fire alarm control system according to an embodiment of the present invention of FIG. 1.
Figure 3:
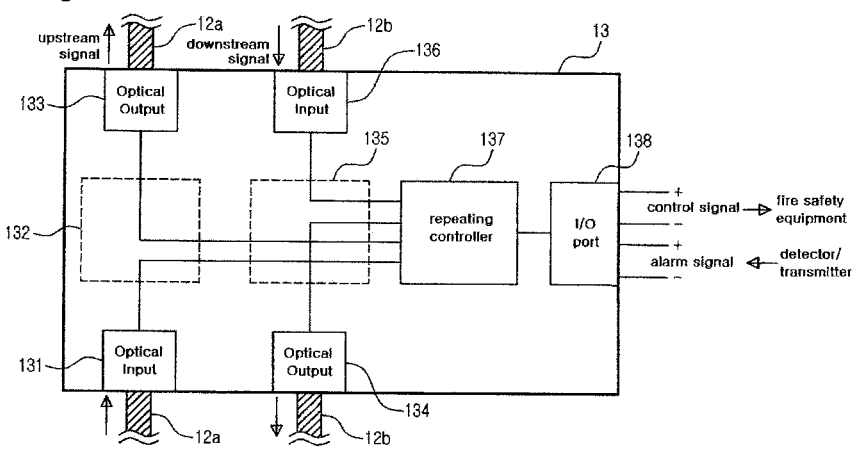
Figure 4:
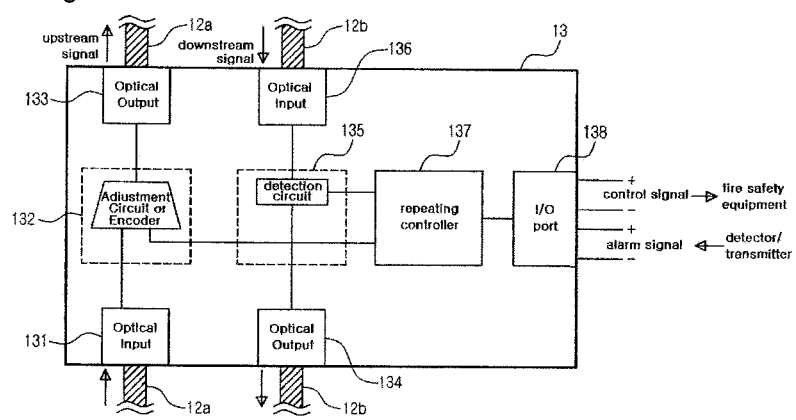

FIGS. 2 to 4 are block diagrams illustrating 2-way optical repeaters available for an R/GR type optically repeating fire alarm control system according to an embodiment of the present invention of FIG. 1.

Referring to FIGS. 2 to 4, the optical repeater 13 includes a first optical input port 131, an upstream branch 132, a first optical output port 133, a second optical output port 134, a downstream branch 135, a second optical input port 136, a repeating controller 137, an I/O port 138. In FIGS. 2 to 4, the upstream branch 132 and the downstream branch 135 may have different configurations, while remaining elements in FIGS. 2 to 4 of the optical repeater 13 are substantially identical.

The first optical input port 131, the upstream branch 132 and the first optical output port 133 constitute an upstream signal path, which delivers alarm signals from other optical repeaters and alarm signals from the detectors/transmitters 14, which are connected to the concerned optical repeater 13, to the R/GR type fire alarm control panel 11. Likewise, the second optical input port 136, the downstream branch 135 and the second optical output port 134 constitute a downstream signal path, which delivers control signals from the R/GR type fire alarm control panel 11 to other optical repeaters 13 and the repeating controller 137.

The repeating controller 137 determines whether the alarm signals from the detectors/transmitters 14 are pertinent or not, and then delivers the alarm signals to the upstream branch 132. Furthermore, the repeating controller 137 determines whether the control signal from the downstream branch 135 regards the fire safety equipment connected to the concerned optical repeater 13, and when the control signal is related to the fire safety equipment connected to the concerned optical repeater 13, then deliver the control signal to the fire safety equipment.

The repeating controller 137 and the detectors/transmitters 14 may be wired with the I/O port 138 in RS485/422 specification or using DC 24 V line. According to the embodiments, the I/O port 138 may include an optical I/O port, which can be coupled to the detectors/transmitters 14 with optical cables.

Specifically, the first optical input port 131 may receive alarm signals delivered via an optical cable from other optical repeater, and then convert the received optical alarm signals into electric alarm signals. The upstream branch 132 may combine alarm signals transferred through the repeating controller 137 originated at the detectors/transmitters 14, and alarm signals electrically converted at the first optical input port 131, and then deliver the combined electric signals to the first optical output port 133. The first optical output port 133 converts the delivered electric signals into optical signals to be output via another optical cable.

The upstream branch 132 may be implemented in varying fashions. Referring to FIG. 2, in some embodiments, the upstream branch 132 may just be a wired tap, which connects two conductive lines. In this case, although the configuration of the upstream branch 132 may be simple, collision may be occurred when alarm signals simultaneously arrive from detectors/transmitter 14 and the other optical repeater 13.

Referring to FIG. 3, in another embodiment, the upstream branch 132 may be configured to electrically connect the first optical input port 131 and the repeating controller 137, and to electrically connect the repeating controller 137 and the first optical output port 133. In this case, alarm signals from other optical repeater 13 are delivered via wiring of the upstream branch 132 to the repeating controller 137 which combines the alarms signals from different sources, so as to deliver the combined alarm signals to the first optical input port 133 via wiring of the upstream branch 132.

Referring to FIG. 4, the upstream branch 132 may be implemented as an adjustment circuit, which, for example when two alarm signals arrives at the same time, is capable of selectively outputting one signal before the other and delaying the other signal for avoiding collision. The upstream branch 132, further, may be implemented as a packet encoder, which, for example, can encode a combined packet loading two alarm signals into one payload to be output. The downstream branch 135 may a detection circuit to extract a control signal to be sent to the fire safety equipment that is connected to the concerned optical repeater 13.

Besides, the second optical input port 136 receives control signals, delivered through an optical cable, originated at the R/GR fire alarm control panel 11, and then converts the received optical control signals into electrical control signals. The downstream branch 135 transfers the control signals, originated at the R/GR fire alarm control panel 11, to the repeating controller 137 and the second optical output port 134, respectively. The second optical output port 134 converts the control signals received into optical control signals to be output through another optical cable.

The downstream branch 135 may be implemented in varying fashions. Referring to FIG. 2, in some embodiments, the downstream branch 135 may just be a wired tap. In this case, the control signals are directed to both of the second optical output port 134 and the repeating controller 137.

Referring to FIG. 3, according to additional embodiments, the downstream branch 135 may be implemented to electrically connect the second optical input port 136 and the repeating controller 137, and to electrically connect the repeating controller 137 and the second optical output port 134. In this case, control signals from antecedent optical repeater 13 are delivered via wiring of the downstream branch 135 to the repeating controller 137. When the repeating controller 137 outputs accordingly processed control signals, the processed control signals are delivered to the second optical output port 134 via wiring of the downstream branch 135. The repeating controller 137 may output the received control signals intact, or may output regenerated control signals by removing part related to the concerned optical repeater 13.

Referring to FIG. 4, the downstream branch 135 may be implemented as a detection circuit, which, for example, may direct control signals to the repeating controller 137 only when there exists any control signal corresponding to the concerned optical repeater 13 among the received control signals, otherwise directing the control signals to the second optical output port 136.

Figure 5:
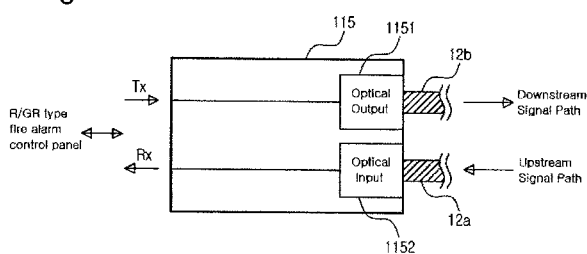
FIG. 5 is a block diagram illustrating an optical converting port available for an R/GR type optically repeating fire alarm control system according to an embodiment of the present invention of FIG. 1.

FIG. 5 is a block diagram illustrating an optical converting port available for an R/GR type optically repeating fire alarm control system according to an embodiment of the present invention of FIG. 1.

Referring to FIG. 5, the optical I/O port 115 includes an optical output port 1151 and an optical input port 1152. The optical output port 1151 converts electrical control signals of the R/GR control panel 11 into optical signals to be output. The optical input port 1152 receives alarm signals in optical fashion, converts the alarm signals to electric signals, and then provides them to the R/GR control panel 11.

Figure 6:
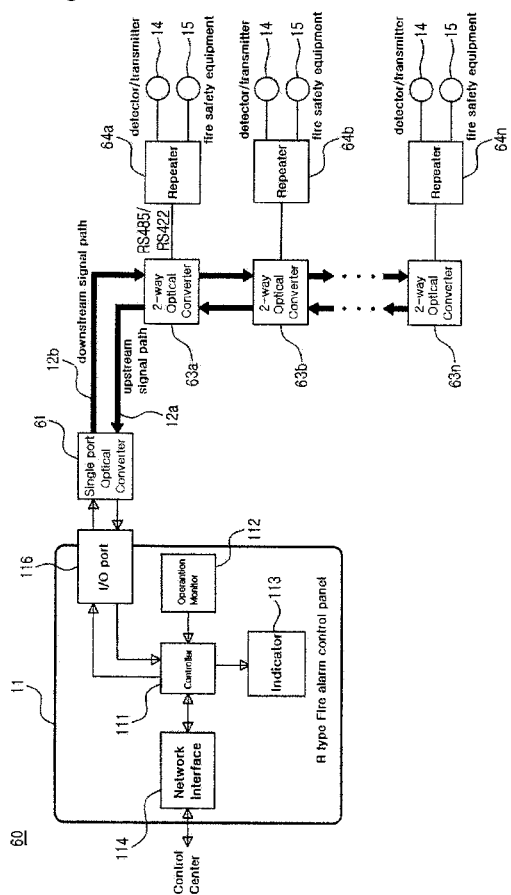
FIG. 6 is a block diagram illustrating an R/GR type optically repeating fire alarm control system according to a different embodiment of the present invention.

FIG. 6 is a block diagram illustrating an R/GR type optically repeating fire alarm control system according to a different embodiment of the present invention.

Referring to FIG. 6, an optically repeating R/GR type fire alarm control system 40 comprises an R/GR type fire alarm control panel 11, a single port optical converter 41, optical cables 12a and 12b, 2-way port optical converters 43a, 43b through 43n, repeaters 44a, 44b through 44n, detectors/transmitters 14 and fire safety equipments 15. The 2-way port optical converters 43a, 43b through 43n are connected in daisy-chain topology.

The R/GR type fire alarm control panel 11, including a controller 111, an operation monitor 112, an indicator 113, a network interface 114 and an optical I/O port 115, may substantially be identical to the R/GR type fire alarm control panel 11 of FIG. 1, so that description related to those may be safely omitted, except that the I/O port 116 of FIG. 6, corresponding to the optical I/O port 115 transacting optical signals in FIG. 1, may transact electric signals satisfying RS485/422 technical specification in FIG. 6.

The single port optical converter 41 couples between the I/O port 116 of the R/GR control panel 11 and the optical cables 12a, 12b, and converts optical alarm signals received via the optical cable 12a into electric alarm signals to be provided to the I/O port 116 of the R/GR control panel 11, while converting control signals from the I/O port 116 of the R/GR control panel 11 into optical control signals to be output via the optical cable 12b.

The 2-way port optical converter 43 may perform signal transfer via the optical cables 12a, 12b between two neighboring repeaters 43 or between the repeater 43 and the control panel 11, and specifically may be connected to the repeaters 44 via RS485/422 communication specification to perform transfer of alarm signals.

The repeater 44 may be implemented as a conventional repeater using RS485/422 communication specification, while the detector/transmitter 14 may be conventional ones.

Figure 7:
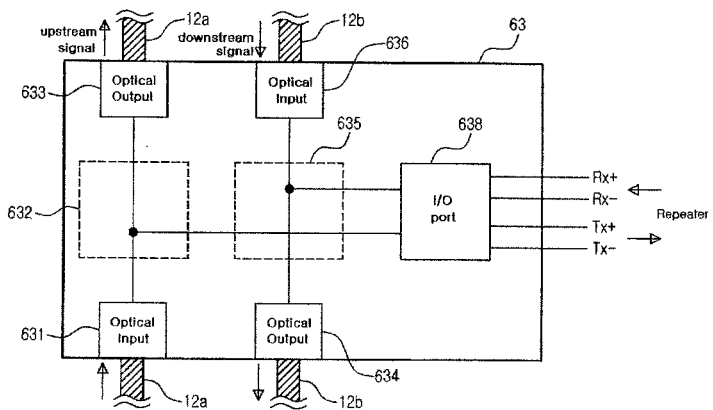
FIGS. 7 and 8 are block diagrams illustrating 2-way optical converters available for an R/GR type optically repeating fire alarm control system according to an embodiment of the present invention of FIG. 6.
Figure 8:
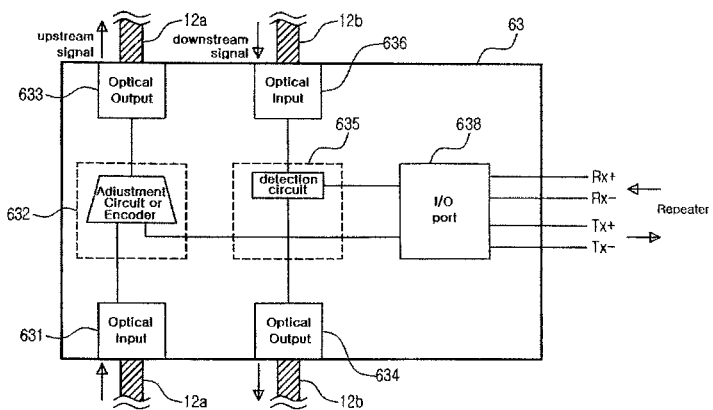

FIGS. 7 and 8 are block diagrams illustrating 2-way port optical converters available for an R/GR type optically repeating fire alarm control system according to an embodiment of the present invention of FIG. 6.

Referring to FIGS. 7 and 8, the 2-way optical converter 43 includes a first optical input port 431, an upstream branch 432, a first optical output port 433, a second optical output port 434, a downstream branch 435, a second optical input port 436, an I/O port 438. In FIGS. 7 and 8, the upstream branch 432 and the downstream branch 435 may have different configurations, while remaining elements in FIGS. 7 and 8 of the 2-way optical converter 43 are substantially identical. The first optical input port 431, the upstream branch 432 and the first optical output port 433 constitute an upstream signal path, which delivers alarm signals from other 2-way optical converter 43 and alarm signals from the detectors/transmitters 14, which are connected to the concerned 2-way optical converter 43, to the R/GR type fire alarm control panel 11. Likewise, the second optical input port 436, the downstream branch 435 and the second optical output port 434 constitute a downstream signal path, which delivers control signals from the R/GR type fire alarm control panel 11 to other 2-way optical converters 43 and the I/O port 438.

The I/O port 438 may convert alarm signals in RS485/422 configuration received from the detector/transmitter 14 via the repeater 44, or DC 24 V signal into a single-ended electric signal which is suitable to be converted to an optical signal, and then deliver the single ended signal to the upstream branch 432. Further, the I/O port 438 receives single-ended control signal from the downstream branch 435, and converts that into RS485/422 regulated control signal or DC 24 V control signal to be output.

Specifically, the first optical input port 431 may receive alarm signals delivered via an optical cable from other optical repeater, and then convert the received optical alarm signals into electric alarm signals. The upstream branch 432 may combine alarm signals transferred through the I/O port 438 originated at the detectors/transmitters 14, and alarm signals electrically converted at the first optical input port 431, and then deliver the combined electric signals to the first optical output port 433. The first optical output port 433 converts the delivered electric signals into optical signals to be output via another optical cable.

The upstream branch 432 may be implemented in varying fashions. Referring to FIG. 7, in some embodiments, the upstream branch 432 may just be a wired tap, which connects two conductive lines. In this case, although the configuration of the upstream branch 432 may be simple, collision may be occurred when alarm signals simultaneously arrive from detectors/transmitter 14 and the other optical converter 43.

Referring to FIG. 8, the upstream branch 432 may be implemented as an adjustment circuit, which, for example when two alarm signals arrives at the same time, is capable of selectively outputting one signal before the other and delaying the other signal for avoiding collision. The upstream branch 432, further, may be implemented as a packet encoder, which, for example, can encode a combined packet loading two alarm signals into one payload to be output.

Besides, the second optical input port 436 receives control signals, which are delivered through an optical cable and originated at the R/GR fire alarm control panel 11, and then converts the received optical control signals into electrical control signals. The downstream branch 435 transfers the control signals, originated at the R/GR fire alarm control panel 11, to the I/O port 438 and the second optical output port 434, respectively. The second optical output port 434 converts the control signals received into optical control signals to be output through another optical cable.

The downstream branch 435 may be implemented in varying fashions. Referring to FIG. 7, in some embodiments, the downstream branch 435 may just be a wired tap. In this case, the control signals are directed to both of the second optical output port 434 and the I/O port 438.

Referring to FIG. 8, the downstream branch 435 may be implemented as a detection circuit, which, for example, may direct control signals to the I/O port 438 only when there exists any control signal corresponding to the concerned 2-way optical converter 43 among the received control signals, otherwise directing the control signals to the second optical output port 436.

Figure 9:
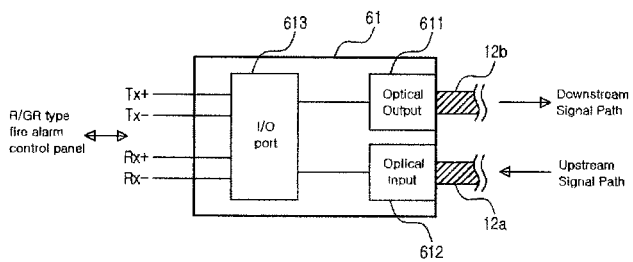
FIG. 9 is a block diagram illustrating a single port optical converter available for an R/GR type optically repeating fire alarm control system according to an embodiment of the present invention of FIG. 6.

FIG. 9 is a block diagram illustrating a single port optical converter available for an R/GR type optically repeating fire alarm control system according to an embodiment of the present invention of FIG. 6.

Referring to FIG. 9, the single port optical I/O port 41 includes an optical output port 411, an optical input port 412, and I/O port 413. The I/O port 413 may convert RS485/422 specified differential control signals from the R/GR control panel 11 into single-ended control signals. The optical output port 411 converts single-ended control signals into optical signals to be output. The optical input port 412 receives control signals in optical fashion, converts the optical alarm signals into single-ended alarm signals, and then provides them to the I/O port 413. The I/O port 413 converts single-ended alarm signals into RS485/422 regulated differential alarm signals to be provided to the R/GR control panel 11.

Figure 10:
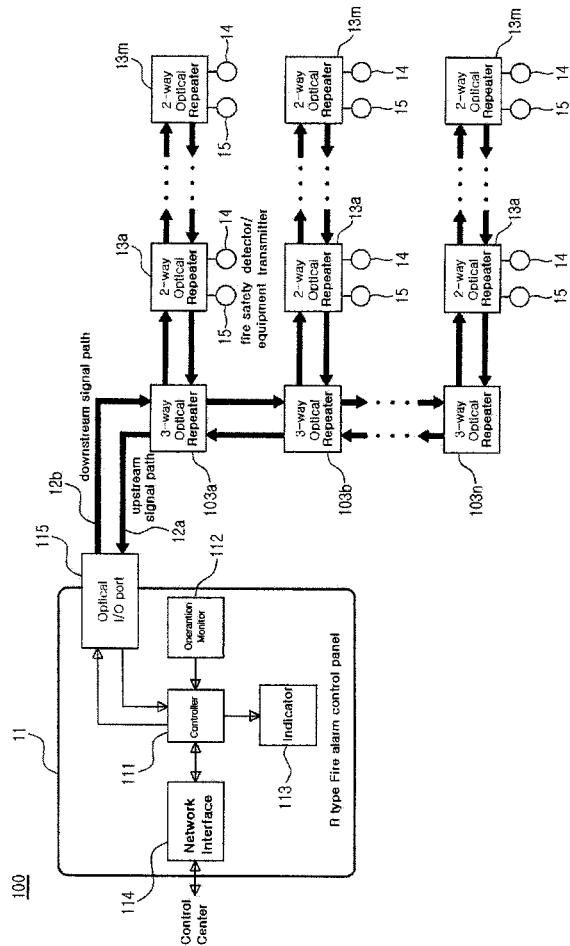
FIG. 10 is a block diagram illustrating an R/GR type optically repeating fire alarm control system according to another embodiment of the present invention.

FIG. 10 is a block diagram illustrating an R/GR type optically repeating fire alarm control system according to another embodiment of the present invention.

Referring to FIG. 10, an optically repeating R/GR type fire alarm control system 100 comprises an R/GR type fire alarm control panel 11, optical cables 12a and 12b, 3-way optical repeaters 103a, 103b through 103n, 2-way optical repeaters 13a through 13m, detectors/transmitters 14 and fire safety equipments 15. The 3-way optical repeaters 103a, 103b through 103n are connected in daisy-chain topology and likewise, the 2-way optical repeaters 13a through 13m are connected in daisy-chain topology.

The R/GR type fire alarm control panel 11 of FIG. 10 may substantially be identical to the R/GR type fire alarm control panel 11 of FIG. 1, so that description may be safely omitted. Likewise, the 2-way optical repeater 13 of FIG. 10 may substantially be identical to the optical repeater 13 of FIG. 1, so that description may be safely omitted.

Respective downstream signal paths of the 3-way optical repeater 103 and the 2-way optical repeater 13 may direct control signals from the R/GR type control panel 11 to fire safety equipments 15, while respective upstream signal paths of the 2-way optical repeater 13 and the 3-way optical repeater 103 may transfer alarm signals issued in a detector/transmitter 14 to the R/GR control panel 11.

The 3-way optical repeaters 103a, 103b through 103n are optically connected to each other via optical cables 12a, 12b and to the respective 2-way optical repeater 13a via different optical cables 12a, 12b.

The 3-way optical repeaters 103a, 103b through 103n are connected to each other in daisy-chain, deliver along with the upstream signal path to an antecedent 3-way optical repeater 103 alarm signals, which are delivered from a following 3-way optical repeater 103, or from a 2-way optical repeater 13a, selectively according to embodiments, or combining the alarm signals received. Furthermore, the 3-way optical repeaters 103a, 103b through 103n deliver, along with the downstream path, control signals, which are transmitted from the R/GR type fire alarm control panel 11 or from an antecedent 3-way optical repeater 103, to 2-way optical repeaters 13a through 13m coupled to fire safety equipments 15, to which the control signals are destined, or to a following 3-way optical repeater 103.

The 3-way optical repeaters 103a, 103b through 103n of the invention may be optically connected other 3-way optical repeaters 103, and be optically connected to the 2-way optical repeater 13a. The 3-way optical repeater 103 may convert received optical signals first into electrical signals, process the converted signal, and then convert the processed electric signals into optical signals to be output.

The 2-way optical repeaters 13 include 2-way optical repeaters 13a through 13m, connected to each other in daisy-chain. The 2-way optical repeaters 13 are optically connected to each other with the optical cables 12a, 12b, and are electrically connected to more than one detector/transmitter 14, respectively. The detectors/transmitters 14 may be grouped by such as office sections or floors in a building, and each group of the detectors/transmitters 14 may be then wired by a simple DC line or an RS485/4222 wire for a 2-way optical repeater 13. The 2-way optical repeaters 13a through 13m may electrically connected to fire safety equipments 15 such as fire extinguishers, i.e. fire hydrants, sprinklers, or halogen extinguishers, or smoke ventilation system, i.e. dampers, fire doors, smoke shutters, smoke windows, evacuation guide light, etc.

The 2-way optical repeaters 13a through 13m deliver along with the upstream signal path, to an antecedent 2-way optical repeater 13 or to the 3-way optical repeater 103 coupled to the concerned 2-way optical repeater 13, alarm signals which are delivered from a following 2-way optical repeater 13, or issued at detectors/transmitters 14, selectively according to embodiments, or combining the alarm signals received. Furthermore, the optical repeaters 13a, 13b through 13n deliver, along with the downstream signal path, control signals, which are transmitted from the 3-way optical repeater 103 coupled to the concerned 2-way optical repeater 13 or from an antecedent 2-way optical repeater 13, to a fire safety equipments 15, to which the control signals are destined, or to a following 2-way optical repeater 13.

The 2-way optical repeaters 13a through 13m of the invention may be optically connected other 2-way optical repeaters 13, and be electrically connected to the detectors/transmitters 14 or fire safety equipments 15. Thus, the 2-way optical repeater 13 may convert received optical signals first into electrical signals, process the converted signal, and then convert the processed electric signals into optical signals to be output.

Similarly to FIG. 1, the detectors/transmitters 14 may be conventional detectors for fire, smoke, heat, or gas, or push-button call points (also known as transmitters) which are activated by a direct action of a man to issue an alarm. The detectors/transmitters may issue electric alarm signals and transmit the alarm signals to the 2-way optical repeaters 13. Commercially available detectors or transmitters may generally produce differential signal satisfying RS485/422 specifications. In these cases, the 2-way optical repeaters 13 may also equip with RS485/422 I/O ports and transact the alarm signals via the I/O ports. Other commercially available detectors or transmitters may produce alarm signals in DC 24 V single-ended signals. In this case, the 2-way optical repeaters 13 can equip with the DC I/O ports, through which the alarm signals may proceed.

According to the embodiments, the detectors/transmitters 14 may issue alarm signals optically, and be connected to the 2-way optical repeaters 13 with optical cables.

Figure 11:
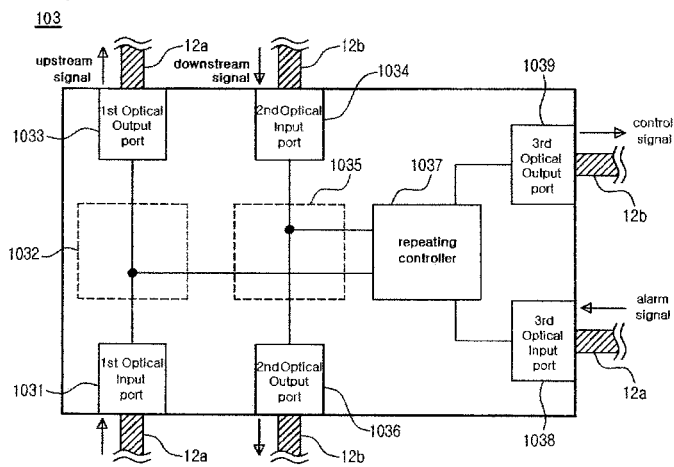
FIGS. 11 to 13 are block diagrams illustrating 3-way optical repeaters available for an R/GR type optically repeating fire alarm control system according to an embodiment of the present invention of FIG. 10.
Figure 12:
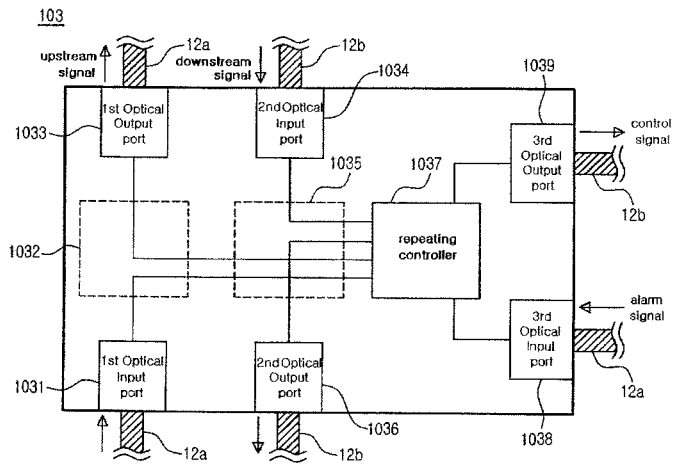
Figure 13:
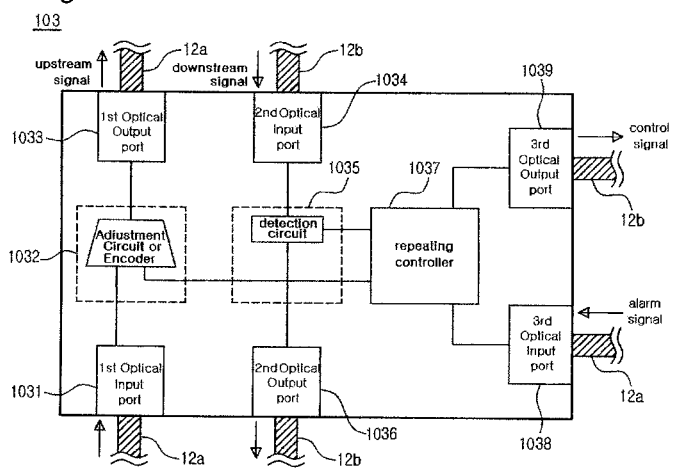

FIGS. 11 to 13 are block diagrams illustrating 3-way optical repeaters available for an R/GR type optically repeating fire alarm control system according to an embodiment of the present invention of FIG. 10.

Referring to FIGS. 11 to 13, the 3-way optical repeater 103 includes a first optical input port 1031, an upstream branch 1032, a first optical output port 1033, a second optical input port 1034, a downstream branch 1035, a second optical output port 1036, a repeating controller 1037, a third optical input port 1038 and a third optical output port 1039. In FIGS. 11 to 13, the upstream branch 1032 and the downstream branch 1035 may have different configurations, while remaining elements of the 3-way optical repeaters 103 in FIGS. 11 to 14 are substantially identical.

The first optical input port 1031, the upstream branch 1032 and the first optical output port 1033 constitute an upstream signal path, which delivers alarm signals from other 3-way optical repeaters 103 and alarm signals from the 2-way optical repeater 13a coupled to the concerned 3-way optical repeater 103 via the repeating controller 1037, to the R/GR type fire alarm control panel 11. Likewise, the second optical input port 1034, the downstream branch 1035 and the second optical output port 1034 constitute a downstream signal path, which delivers control signals from the R/GR type fire alarm control panel 11 to other 3-way optical repeaters 103 and the repeating controller 1037.

The third optical input port 1038 converts optical alarm signals from the 2-way optical repeater 13 into electric alarm signals to be transferred to the repeating controller 1037. The repeating controller 137 determines whether the alarm signals from the 2-way optical repeater 13 via the third optical input port 1038 are pertinent or not, and if affirmative, then delivers the alarm signals to the upstream branch 1032. Furthermore, the repeating controller 1037 determines whether the control signal from the downstream branch 1035 regards the fire safety equipment connected to the 2-way optical repeater 13, which is relayed by the concerned 3-way optical repeater 103, and when the control signal is related to the fire safety equipment connected to the concerned 2-way optical repeater 13, then deliver the control signal to the fire safety equipment. The third optical output port 1039 converts the control signals into optical control signals to be output to the 2-way optical repeater 13.

Specifically, the first optical input port 1031 may receive alarm signals delivered via an optical cable from other 3-way optical repeater, and then convert the received optical alarm signals into electric alarm signals. The upstream branch 1032 may combine alarm signals transferred through the repeating controller 1037 from the 2-way optical repeater 13, and alarm signals electrically converted at the first optical input port 1031, and then deliver the combined electric signals to the first optical output port 1033. The first optical output port 1033 converts the delivered electric signals into optical signals to be output via another optical cable.

The upstream branch 1032 may be implemented in varying fashions. Referring to FIG. 11, in some embodiments, the upstream branch 1032 may just be a wired tap, which connects two conductive lines respectively from the first optical output port 1031 and the repeating controller 1037. In this case, although the configuration of the upstream branch 1032 may be simple, collision may be occurred when alarm signals simultaneously arrive from 2-way optical repeater 13 and the other 3-way optical repeater 103.

Referring to FIG. 12, in another embodiment, the upstream branch 1032 may be configured to electrically connect the first optical input port 1031 and the repeating controller 1037, and to electrically connect the repeating controller 1037 and the first optical output port 1033. In this case, alarm signals from other optical repeater 13 are delivered via wiring of the upstream branch 1032 to the repeating controller 1037 which combines the alarms signals from different sources, so as to deliver the combined alarm signals to the first optical input port 1033 via wiring of the upstream branch 1032.

Referring to FIG. 13, the upstream branch 1032 may be implemented as an adjustment circuit, which, for example when two alarm signals arrives at the same time, is capable of selectively outputting one signal before the other and delaying the other signal for avoiding collision. The upstream branch 1032, further, may be implemented as a packet encoder, which, for example, can encode a combined packet loading two alarm signals into one payload to be output. The downstream branch 1035 may a detection circuit to extract a control signal to be sent to the fire safety equipment that is connected to the concerned 2-way optical repeater 13.

Besides, the second optical input port 1034 receives control signals, delivered through an optical cable, originated at the R/GR fire alarm control panel 11, and then converts the received optical control signals into electrical control signals. The downstream branch 1035 transfers the control signals, originated at the R/GR fire alarm control panel 11, to the repeating controller 1037 and the second optical output port 1036, respectively. The second optical output port 1036 converts the control signals received into optical control signals to be output through another optical cable.

The downstream branch 1035 may be implemented in varying fashions. Referring to FIG. 11, at some embodiments, the downstream branch 1035 may just be a wired tap. In this case, the control signals are directed to both of the second optical output port 1036 and the repeating controller 137

Referring again to FIG. 12, according to additional embodiments, the downstream branch 1035 may be implemented to electrically connect the second optical input port 1034 and the repeating controller 1037, and to electrically connect the repeating controller 1037 and the second optical output port 1036. In this case, control signals from antecedent 3-way optical repeater 103 are delivered via wiring of the downstream branch 1035 to the repeating controller 1037. When the repeating controller 1037 outputs accordingly processed control signals, the processed control signals are delivered to the second optical output port 1036 via wiring of the downstream branch 1035. The repeating controller 137 may output the received control signals intact, or may output regenerated control signals by removing part related to the concerned 3-way optical repeater 103

Referring to FIG. 13, the downstream branch 1035 may be implemented as a detection circuit operating under control of the repeating controller 1037, which, for example, may direct control signals to the repeating controller 1037 only when there exists any control signal corresponding to the concerned 3-way optical repeater 103 among the received control signals, otherwise directing the control signals to the second optical output port 1036.

Figure 14:
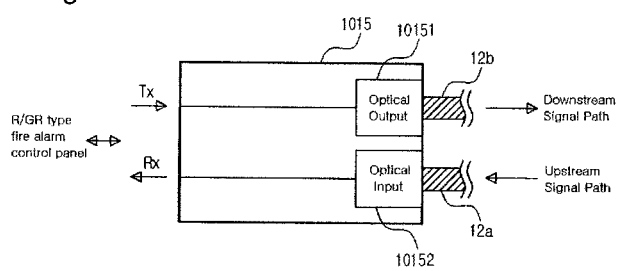
FIG. 14 is a block diagram illustrating an optical converting port available for an R/GR type optically repeating fire alarm control system according to an embodiment of the present invention of FIG. 10.

FIG. 14 is a block diagram illustrating an optical converting port available for an R/GR type optically repeating fire alarm control system according to an embodiment of the present invention of FIG. 10.

Referring to FIG. 14, the optical I/O port 1015 includes an optical output port 10151 and an optical input port 10152. The optical output port 10151 converts electrical control signals of the R/GR control panel 11 into optical signals to be output. The optical input port 10152 receives alarm signals in optical fashion, converts the alarm signals to electric signals, and then provides them to the R/GR control panel 11.

Figure 15:
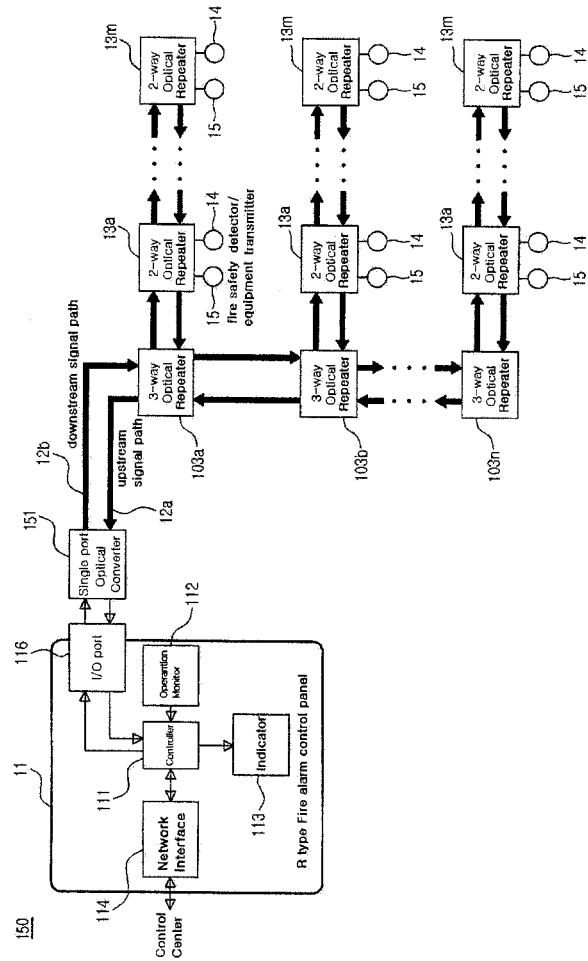
FIG. 15 is a block diagram illustrating an R/GR type optically repeating fire alarm control system according to another embodiment of the present invention.

FIG. 15 is a block diagram illustrating an R/GR type optically repeating fire alarm control system according to another embodiment of the present invention.

Referring to FIG. 15, an optically repeating R/GR type fire alarm control system 150 comprises an R/GR type fire alarm control panel 11, a single port optical converter 151, optical cables 12a and 12b, 3-way optical repeaters 103a, 103b through 103n, 2-way optical repeaters 13a through 13m, detectors/transmitters 14 and fire safety equipments 15. The 3-way optical repeaters 103a, 103b through 103n are connected in daisy-chain topology and likewise, the 2-way optical repeaters 13a through 13m are connected in daisy-chain topology.

The R/GR type fire alarm control panel 11 of FIG. 15, including a controller 111, an operation monitor 112, an indicator 113, a network interface 114 and an I/O port 116, may substantially be identical to the R/GR type fire alarm control panel 11 of FIG. 10, so that description related to those may be safely omitted, except that the I/O port 116 of FIG. 15, corresponding to the I/O port 116 transacting optical signals in FIG. 6, may transact electric signals satisfying wired communication specification such as RS485/422, Ethernet, etc.

The single port optical converter 151 couples between the I/O port 116 of the R/GR control panel 11 and the optical cables 12a, 12b, and converts optical alarm signals received via the optical cable 12a into electric alarm signals to be provided to the I/O port 116 of the R/GR control panel 11, while converting control signals from the I/O port 116 of the R/GR control panel 11 into optical control signals to be output via the optical cable 12b.

The 3-way optical repeaters 103a, 130b through 130n and the 2-way optical repeaters 13a through 13m may substantially be identical to respective ones of FIG. 10, so that description may be safely omitted.

Figure 16:
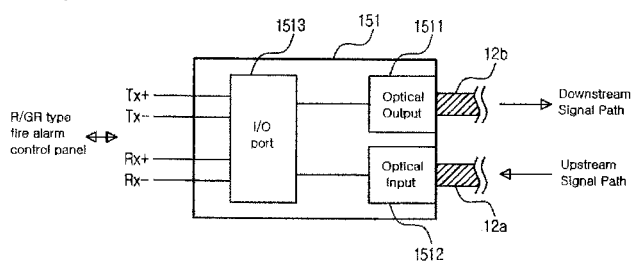
FIG. 16 is a block diagram illustrating a single port optical converter available for an R/GR type optically repeating fire alarm control system according to an embodiment of the present invention of FIG. 15.

FIG. 16 is a block diagram illustrating a single port optical converter available for an R/GR type optically repeating fire alarm control system according to an embodiment of the present invention of FIG. 15.

Referring to FIG. 16, the single port optical I/O port 151 includes an optical output port 1511, an optical input port 1512, and I/O port 1513. The I/O port 1513 may convert RS485/422 specified differential control signals from the R/GR control panel 11 into single-ended control signals. The optical output port 1511 converts single-ended control signals into optical signals to be output. The optical input port 1512 receives control signals in optical fashion, converts the alarm signals to electric signals, and then provides them to the R/GR control panel 11. The I/O port 1513 converts single-ended alarm signals into RS485/422 regulated differential alarm signals to be provided to the R/GR control panel 11.

Figure 17:
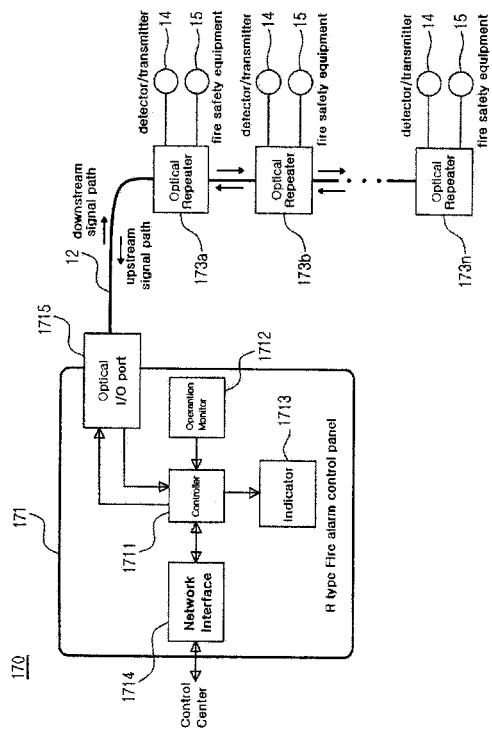
FIG. 17 is a block diagram illustrating an R/GR type optically repeating fire alarm control system according to another embodiment of the present invention.

FIG. 17 is a block diagram illustrating an R/GR type optically repeating fire alarm control system according to another embodiment of the present invention.

Referring to FIG. 17, an optically repeating R/GR type fire alarm control system 170 comprises an R/GR type fire alarm control panel 171, optical cables 12, optical repeaters 173a, 173b through 173n, detectors/transmitters 14 and fire safety equipments 15. The optical repeaters 173a, 173b through 173n are connected in daisy-chain topology.

Specifically, the R/GR type fire alarm control panel 171 of FIG. 17 may substantially be identical to control panels 11 in FIGS. 1 and 10, except that the optical I/O port 1715 transacts upstream signal and downstream signal through single optical cable 12 rather than the optical I/O port 115 of control panel 11 in FIGS. 1 and 10. The optical I/O port 1715 of the R/GR type fire alarm control panel 171 receives a fire alarm signal issued at the detector/transmitter 14 through the optical cable 12 in a fashion of an upstream optical signal, then converts the optical signal into an electric signal to be transmitted to the controller 1711, as well as receiving a control signal from the controller 1711, which is provided from the control center to each fire safety equipment, converting the control signal into an optical signal and transmitting the optical signal through the optical cable 12.

A downstream signal path in the optical repeater 173 denotes a path propagating a control signal originated at the R/GR fire alarm control panel 171 via the respective optical repeaters 173 to corresponding fire safety equipments 15, while an upstream signal path in the repeater 173 means a path carrying an alarm signal issued in a detector/transmitter 14 through the respective optical repeater 173 to the R/GR type fire alarm control panel 171.

The optical cable 12 indicates a medium that may carry an upstream optical signal including an alarm signal to the R/GR type fire alarm control panel 171 and a downstream optical signal including a control signal from the R/GR type fire alarm control panel 171. The upstream and downstream optical signals may be signals having different center wave length or being encoded different channel encoding methods.

The optical repeaters 173a, 173b through 173n are optically connected to each other with the optical cables 12 and are electrically connected to more than one detector/transmitter 14, respectively. The detectors/transmitters 14 may be grouped by such as office sections or floors in a building, and each group of the detectors/transmitters 14 may be then wired by a simple DC line or an RS485/4222 wire for an optical repeater 173. The optical repeaters 173a, 173b through 173n may electrically connected to fire safety equipments 15 such as fire extinguishers, i.e. fire hydrants, sprinklers, or halogen extinguishers, or smoke ventilation system, i.e. dampers, fire doors, smoke shutters, smoke windows, evacuation guide light, etc.

The optical repeaters 173a, 173b through 173n are connected to each other in daisy-chain, deliver to an antecedent optical repeater 173 alarm signals, which are delivered from a following optical repeater 173, or issued at detectors/transmitters 14, selectively according to embodiments, or combining the alarm signals received. Furthermore, the optical repeaters 173a, 173b through 173n deliver control signals, which are transmitted from the R/GR type fire alarm control panel 171 or from an antecedent optical repeater 173, to fire safety equipments 15, to which the control signals are destined, or to a following optical repeater 173.

The optical repeaters 173a, 173b through 173n of the invention may be optically connected other optical repeaters 173, and be electrically connected to the detectors/transmitters 14 or fire safety equipments 15. Thus, the optical repeater 173 may convert received optical signals first into electrical signals, process the converted signal, and then convert the processed electric signals into optical signals to be output.

The detectors/transmitters 14 may be conventional detectors for fire, smoke, heat, or gas, or push-button call points (also known as transmitters) which are activated by a direct action of a man to issue an alarm. The detectors/transmitters may issue electric alarm signals and transmit the alarm signals to the optical repeaters 173. Commercially available detectors or transmitters may generally produce differential signal satisfying RS485/422 specifications. In these cases, the optical repeaters 173 may also equip with RS485/422 I/O ports and transact the alarm signals via the I/O ports. Other commercially available detectors or transmitters may produce alarm signals in DC 24 V single-ended signals. In this case, the optical repeaters 173 can equip with the DC I/O ports, through which the alarm signals may proceed.

According to the embodiments, the detectors/transmitters 14 may issue alarm signals optically, and be connected to the optical repeaters 173 with optical cables.

Figure 18:
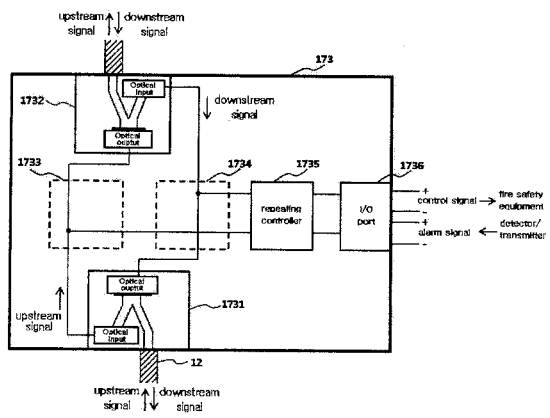
FIGS. 18 to 20 are block diagrams illustrating 2-way optical repeaters available for an R/GR type optically repeating fire alarm control system according to an embodiment of the present invention of FIG. 17.
Figure 19:
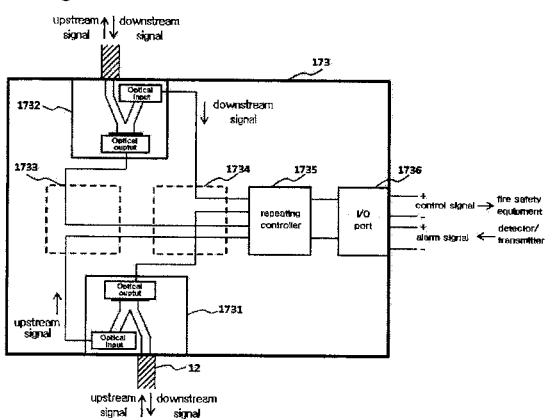
Figure 20:
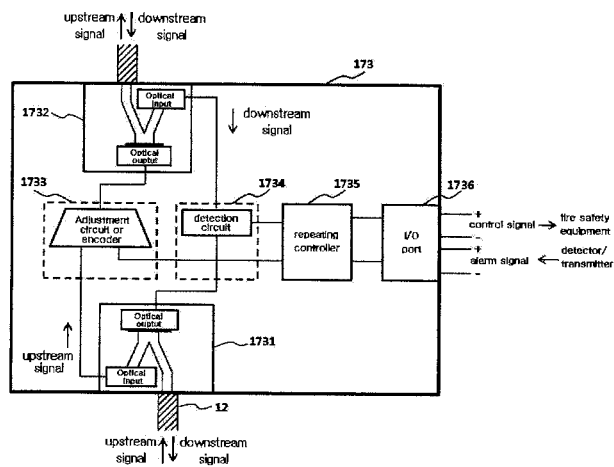

FIGS. 18 to 20 are block diagrams illustrating 2-way optical repeaters available for an R/GR type optically repeating fire alarm control system according to an embodiment of the present invention of FIG. 17.

Referring to FIGS. 18 to 20, the optical repeater 173 includes a first optical module 1731, a second optical module 1732, an upstream branch 1733, a downstream branch 1734, a repeating controller 1735, an I/O port 1736. In FIGS. 18 to 20, the upstream branch 1733 and the downstream branch 1734 may have different configurations, while remaining elements in FIGS. 18 to 20 of the optical repeater 173 are substantially identical.

The first and second optical modules 1731 and 1732 may bi-directionally transact optical signals through a single optical cable 12. Respective wave lengths for transmitted optical signal and received optical signal in the bi-directional optical module may be different. The optical module illustrated in FIGS. 21 to 23 discriminates an optical signal to be transmitted from an optical signal to be received, using a wave guide forked as Y-shaped branch and dielectric reflector. For transmission, optical signals, generated at an optical output unit composed of a laser diode, for example, may be guided through the wave guide to the optical cable. For reception, optical signals, incident from the optical cable, propagates through the wave guide, reflects on the dielectric reflector and then reaches at an optical input unit.

The optical input unit of the first optical module 1731, the upstream branch 1733 and the optical output unit of the second optical module 1732 constitute an upstream signal path, which delivers alarm signals from other optical repeaters and alarm signals from the detectors/transmitters 14, which are connected to the concerned optical repeater 173, to the R/GR type fire alarm control panel 171. Rather, the optical input unit of the second optical module 1732, the downstream branch 1734 and the optical output unit of the first optical module 1731 constitute a downstream signal path, which delivers control signals from the R/GR type fire alarm control panel 171 to other optical repeaters 173 and the repeating controller 1735.

The repeating controller 1735 determines whether the alarm signals from the detectors/transmitters 14 are pertinent or not, and then delivers the alarm signals to the upstream branch 1733. Furthermore, the repeating controller 1735 determines whether the control signal from the downstream branch 1734 regards the fire safety equipment connected to the concerned optical repeater 173, and when the control signal is related to the fire safety equipment connected to the concerned optical repeater 173, then deliver the control signal to the fire safety equipment.

The repeating controller 1735 and the detectors/transmitters 14 may be wired with the I/O port 1736 in RS485/422 specification or using DC 24 V line. According to the embodiments, the I/O port 1736 may include an optical I/O port, which can be coupled to the detectors/transmitters 14 with optical cables.

Specifically, the optical input unit of the first optical module 1731 may receive upstream optical signals delivered via an optical cable from other optical repeater, and then convert the received upstream optical signals into electric upstream electric signals. The upstream branch 1733 may combine alarm signals transferred through the repeating controller 1735 originated at the detectors/transmitters 14, and the upstream electric signals converted at the optical input unit of first optical module 1731, and then deliver the combined upstream electric signals to the optical output unit of the second optical module 1732. The second optical module 1732 converts the delivered combined upstream electric signals into combined upstream optical signals to be output via another optical cable.

The upstream branch 1733 may be implemented in varying fashions. Referring to FIG. 18, in some embodiments, the upstream branch 1733 may just be a wired tap, which connects two conductive lines. In this case, although the configuration of the upstream branch 1733 may be simple, collision may be occurred when alarm signals simultaneously arrive from detectors/transmitter 14 and the other optical repeater 173.

Referring to FIG. 19, in another embodiment, the upstream branch 1733 may be configured to electrically connect the optical input unit of the first optical module 1731 and the repeating controller 1735, and to electrically connect the repeating controller 1735 and the optical output unit of the second optical module 1732. In this case, upstream signals from other optical repeater 173 are delivered via wiring of the upstream branch 1733 to the repeating controller 1735 which combines the upstream electric signals and the alarm signals, so as to deliver the combined electric signals to the optical output unit of the second optical module 1732 via wiring of the upstream branch 1733.

Referring to FIG. 20, the upstream branch 1733 may be implemented as an adjustment circuit, which, for example when two alarm signals arrives at the same time, is capable of selectively outputting one signal before the other and delaying the other signal for avoiding collision. The upstream branch 1733, further, may be implemented as a packet encoder, which, for example, can encode a combined packet loading two alarm signals into one payload to be output. The downstream branch 1734 may a detection circuit to extract a control signal to be sent to the fire safety equipment that is connected to the concerned optical repeater 173.

Besides, the optical input unit of the second optical module 1732 receives downstream optical signals with which control signals originated at the R/GR fire alarm control panel 171 are delivered through an optical cable, and then converts the received downstream optical signals into downstream electrical signals. The downstream electric signal may be identical to the control signal originated at the R/GR fire alarm control panel 171. The downstream branch 1734 transfers the downstream electric signals to the repeating controller 1735 and the optical output unit of the first optical module 1731, respectively. The optical output unit of the first optical module 1731 converts the received downstream electric signals into downstream optical signals to be output through another optical cable 12.

The downstream branch 1734 may be implemented in varying fashions. Referring to FIG. 18, in some embodiments, the downstream branch 1734 may just be a wired tap. In this case, the control signals are directed to both of the optical output unit of the first optical module 1731 and the repeating controller 1735.

Referring to FIG. 19, according to additional embodiments, the downstream branch 1734 may be implemented to electrically connect the optical input unit of the second optical module 1732 and the repeating controller 1735, and to electrically connect the repeating controller 1735 and the optical output unit of the first optical module 1731. In this case, control signals among the downstream electric signals from antecedent optical repeater 173 are delivered via wiring of the downstream branch 1734 to the repeating controller 1735. When the repeating controller 1735 outputs accordingly processed control signals, the processed control signals are delivered to the optical output unit of the first optical module 1731 via wiring of the downstream branch 1734. The repeating controller 1735 may output the received control signals intact, or may output regenerated control signals by removing part related to the concerned optical repeater 173.

Referring to FIG. 20, the downstream branch 1734 may be implemented as a detection circuit, which, for example, may direct control signals to the repeating controller 1735 only when there exists any control signal corresponding to the concerned optical repeater 173 among the received control signals, otherwise directing the control signals to the optical output unit of the first optical module 1731.

Figure 21:
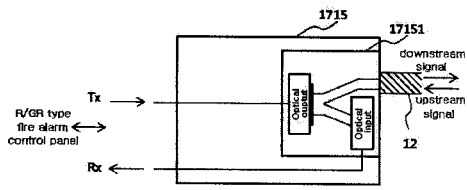
FIG. 21 is a block diagram illustrating an optical converting port available for an R/GR type optically repeating fire alarm control system according to an embodiment of the present invention of FIG. 17.

FIG. 21 is a block diagram illustrating an optical converting port available for an R/GR type optically repeating fire alarm control system according to an embodiment of the present invention of FIG. 17.

Referring to FIG. 21, the optical I/O port 1715 includes an optical module 17151. The optical output unit of the optical module 17151 converts electrical control signals of the R/GR control panel 171 into downstream optical signals to be output. The optical input unit of the optical module 17151 receives upstream optical signal including alarm signals, converts the upstream optical signals to electric signals, and then provides them to the R/GR control panel 171.

Figure 22:
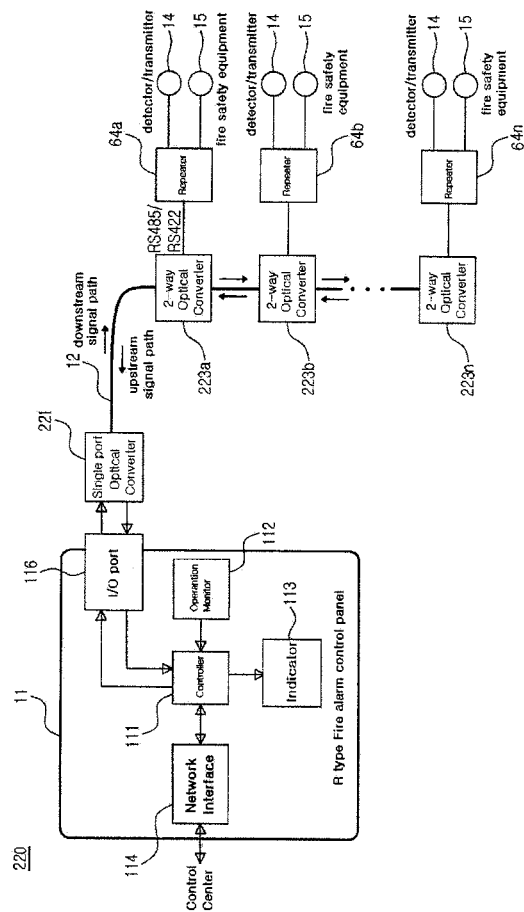
FIG. 22 is a block diagram illustrating an R/GR type optically repeating fire alarm control system according to yet another embodiment of the present invention.

FIG. 22 is a block diagram illustrating an R/GR type optically repeating fire alarm control system according to yet another embodiment of the present invention.

Referring to FIG. 22, an optically repeating R/GR type fire alarm control system 220 comprises an R/GR type fire alarm control panel 11, a single port optical converter 221, optical cables 12, optical converters 223*a*, 223*b* through 223*n*, repeaters 64*a*, 64*b* through 64*n*, detectors/transmitters 14 and fire safety equipments 15. The optical converters 223*a*, 223*b* through 223*n* are connected in daisy-chain topology.

The repeaters 64*a*, 64*b* through 64*n* may conventionally relay using electric signals, as well as optical signals according to embodiments.

The R/GR type fire alarm control panel 11, including a controller 111, an operation monitor 112, an indicator 113, a network interface 114 and an I/O port 116, may substantially be identical to the R/GR type fire alarm control panel 11 of FIG. 17, so that description related to those may be safely omitted, except that the I/O port 116 of FIG. 22, corresponding to the optical I/O port 1715 transacting optical signals in FIG. 17, may transact electric signals satisfying RS485/422 technical specification as FIGS. 6 and 15.

The single port optical converter 221 couples between the I/O port 116 of the R/GR control panel 11 and the optical cable 12, and converts alarm signals in a fashion of upstream optical signals received via the optical cable 12 into electric signals to be provided to the I/O port 116 of the R/GR control panel 11, while converting control signals from the I/O port 116 of the R/GR control panel 11 into downstream optical signals to be output via the optical cable 12. The optical I/O port 115 in FIG. 17 may be substantially identical to mixed one of the I/O port 116 and the single port optical converter 221 in FIG. 22.

The 2-way port optical converter 223 may perform signal transfer via the optical cable 12 between two neighboring repeaters 64 or between the repeater 64 and the control panel 11, and specifically may be connected to the repeaters 64 via RS485/422 communication specification to perform transfer of alarm signals.

The repeater 64 may be implemented as a conventional repeater using RS485/422 communication specification, while the detector/transmitter 14 may be conventional ones.

Figure 23:
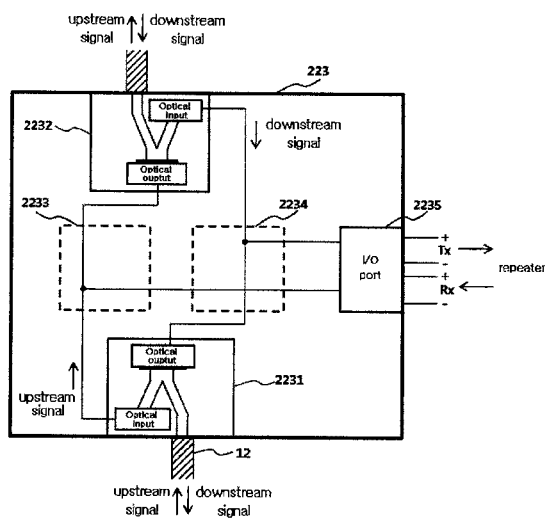
FIGS. 23 and 24 are block diagrams illustrating 2-way optical converters available for an R/GR type optically repeating fire alarm control system according to an embodiment of the present invention of FIG. 17.
Figure 24:
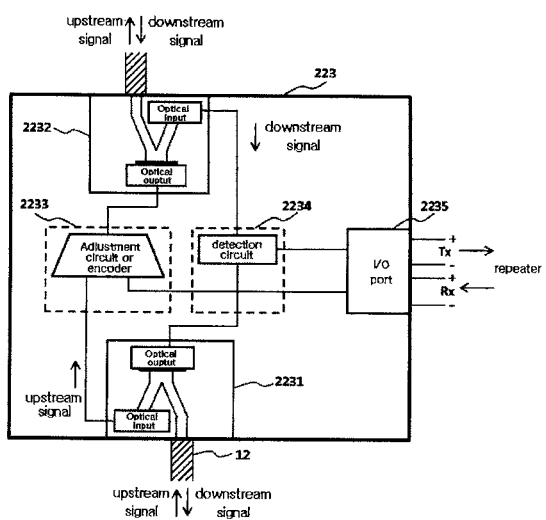

FIGS. 23 and 24 are block diagrams illustrating 2-way optical converters available for an R/GR type optically repeating fire alarm control system according to an embodiment of the present invention of FIG. 17.

Referring to FIGS. 23 and 24, the 2-way optical converter 223 includes a first optical module 2231, a second optical module 2232, an upstream branch 2233, a downstream branch 2234, an I/O port 2235. In FIGS. 23 and 24, the upstream branch 2233 and the downstream branch 2234 may have different configurations, while remaining elements in FIGS. 23 and 24 of the 2-way optical converter 223 are substantially identical.

The optical input unit of the first optical module 2231, the upstream branch 2233 and the optical output unit of the second optical module 2232 constitute an upstream signal path, while the optical input unit of the second optical module 2232, the downstream branch 2234 and the optical output unit of the first optical module 2231 constitute a downstream signal path.

The I/O port 2235 may convert alarm signals in RS485/422 configuration received from the detector/transmitter 14 via the repeater 64, or DC 24 V signal, into a single-ended electric signal which is suitable to be converted to an optical signal, and then deliver the single ended signal to the upstream branch 2233. Further, the I/O port 2235 receives single-ended control signal from the downstream branch 2234 and converts that into RS485/422 regulated control signal or DC 24 V control signal to be output.

Specifically, the optical input unit of the first optical module 2231 may receive upstream optical signals delivered via an optical cable 12 from other 2-way optical repeater, and then convert the received upstream optical signals into upstream electric alarm signals. The upstream branch 2233 may combine alarm signals transferred through the I/O port 2235 originated at the detectors/transmitters 14, and upstream electric signals electrically converted at the optical input unit of the first optical module 2231, and then deliver the combined upstream electric signals to the optical output unit of the second optical module 2232. The optical output unit of the second optical module 2232 converts the delivered combined upstream electric signals into upstream optical signals to be output via another optical cable 12.

The upstream branch 2233 may be implemented in varying fashions. Referring to FIG. 23, in some embodiments, the upstream branch 2233 may just be a wired tap, which connects two conductive lines. In this case, although the configuration of the upstream branch 2233 may be simple, collision may be occurred when alarm signals simultaneously arrive from detectors/transmitter 14 via the repeater 64 and the other 2-way optical converter 223.

Referring to FIG. 24, the upstream branch 2233 may be implemented as an adjustment circuit, which, for example when two alarm signals arrives at the same time, is capable of selectively outputting one signal before the other and delaying the other signal for avoiding collision. The upstream branch 2233, further, may be implemented as a packet encoder, which, for example, can encode a combined packet loading two alarm signals into one payload to be output.

Besides, the optical input unit of the second optical module 2232 receives downstream optical signals, including control signals, which are originated at the R/GR fire alarm control panel 11 and delivered through other 2-way optical converter 223 and an optical cable, and then converts the received downstream optical signals into downstream electrical signals. The downstream branch 2234 transfers the control signals, originated at the R/GR fire alarm control panel 11, to the I/O port 2235 and the optical output unit of the first optical module 2231, respectively. The optical output unit of the first optical module 2231 converts the downstream electric signals received into downstream optical signals to be output through another optical cable 12.

The downstream branch 2234 may be implemented in varying fashions. Referring to FIG. 23, in some embodiments, the downstream branch 2234 may just be a wired tap. In this case, the control signals are directed to both of the optical output unit of the first optical module 2231 and the I/O port 2235.

Referring to FIG. 24, the downstream branch 2234 may be implemented as a detection circuit, which, for example, may direct control signals to the I/O port 2235 only when there exists any control signal corresponding to the concerned 2-way optical converter 223 among the received control signals, otherwise directing the control signals to the optical output unit of the first optical module 2231.

Figure 25:
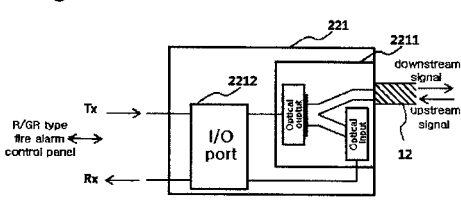
FIG. 25 is a block diagram illustrating a single port optical converter available for an R/GR type optically repeating fire alarm control system according to an embodiment of the present invention of FIG. 22.

FIG. 25 is a block diagram illustrating a single port optical converter available for an R/GR type optically repeating fire alarm control system according to an embodiment of the present invention of FIG. 22. Referring to FIG. 25, the single port optical converter 221 includes an optical module 2211, and I/O port 2212. The I/O port 2212 may convert RS485/422 specified differential control signals from the R/GR control panel 11 into single-ended control signals. The optical module 2211 converts single-ended control signals into downstream optical signals to be output. The optical module 2211 receives alarm signals among the upstream optical signals, converts the alarm signals to electric single-ended signals, and then provides them to the I/O port 2212. The I/O port 2212 converts single-ended alarm signals into RS485/422 regulated differential alarm signals to be provided to the R/GR control panel 11.

Figure 26:
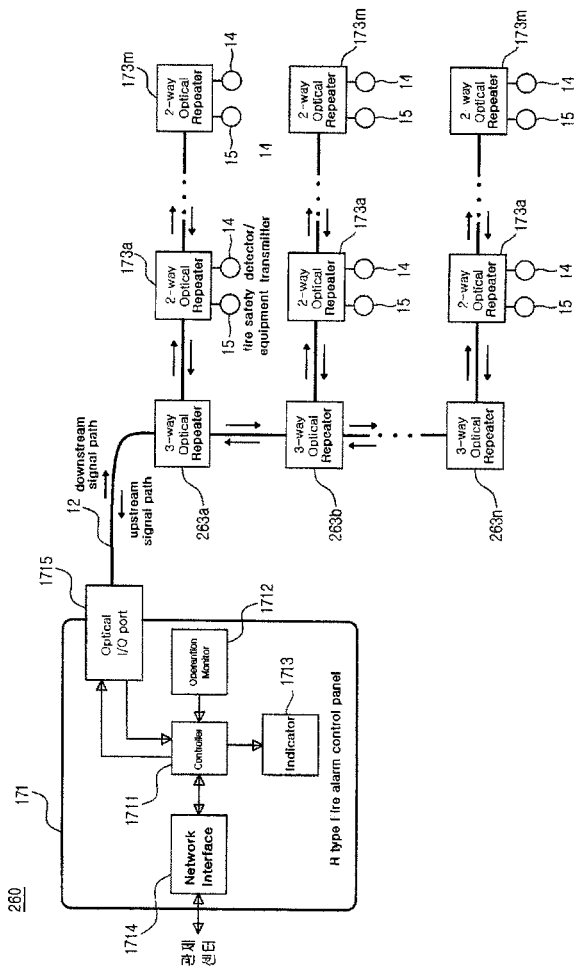
FIG. 26 is a block diagram illustrating an R/GR type optically repeating fire alarm control system according to still another embodiment of the present invention.

FIG. 26 is a block diagram illustrating an R/GR type optically repeating fire alarm control system according to still another embodiment of the present invention.

Referring to FIG. 26, an optically repeating R/GR type fire alarm control system 260 comprises an R/GR type fire alarm control panel 171, optical cables 12, 2-way optical repeaters 263a, 263b through 263n, 2-way optical repeaters 173a through 173m, detectors/transmitters 14 and fire safety equipments 15. The 3-way optical repeaters 263a, 263b through 263n are connected in daisy-chain topology and likewise, the 2-way optical repeaters 173a through 173m are connected in daisy-chain topology.

The R/GR type fire alarm control panel 171 of FIG. 26 may substantially be identical to the R/GR type fire alarm control panel 171 of FIG. 17, so that description may be safely omitted.

Respective downstream signal paths of the 3-way optical repeater 263 and the 2-way optical repeater 173 may direct control signals from the R/GR type control panel 171 to fire safety equipments 15, while respective upstream signal paths of the 2-way optical repeater 173 and the 3-way optical repeater 263 may transfer alarm signals issued in a detector/transmitter 14 to the R/GR control panel 11.

According to the embodiments, the R/GR type fire alarm control panel 171 may have an RS485 or RS422 I/O port, as a conventional one does. In such a case, the optical I/O port 1715 may be embodied an additional item, such as a single port optical converter, which can be installed to the RS485/422 port from exterior of the R/GR control panel 171, converting an optical signal into an RS485/422 signal to be provided to the R/GR control panel 171, or converting an RS485/422 differential signal from the R/GR control panel 171 into an optical signal.

The optical cable 12 indicates a medium that may carry an upstream optical signal including an alarm signal to the R/GR type fire alarm control panel 171 and a downstream optical signal including a control signal from the R/GR type fire alarm control panel 171. The upstream and downstream optical signals may be signals having different center wave length or being encoded different channel encoding methods.

The 3-way optical repeaters 263a, 263b through 263n are optically connected to each other via optical cables 12 and to the respective 2-way optical repeater 173a via another optical cable 12.

The 3-way optical repeaters 263a, 263b through 263n are connected to each other in daisy-chain, deliver along with the upstream signal path to an antecedent 3-way optical repeater 263 alarm signals, which are delivered from a following 3-way optical repeater 263, or from a 2-way optical repeater 173, selectively according to embodiments, or combining the alarm signals received. Furthermore, the 3-way optical repeaters 263a, 263b through 263n deliver, along with the downstream path, control signals, which are transmitted from the R/GR type fire alarm control panel 171 or from an antecedent 3-way optical repeater 263, to 2-way optical repeaters 173a through 173m coupled to fire safety equipments 15, to which the control signals are destined, or to a following 3-way optical repeater 263.

The 3-way optical repeaters 263a, 263b through 263n of the invention may be optically connected other 3-way optical repeaters 263, and be optically connected to the 2-way optical repeater 173. The 3-way optical repeater 263 may convert received optical signals first into electrical signals, process the converted signal, and then convert the processed electric signals into optical signals to be output.

The 2-way optical repeaters 173 include 2-way optical repeaters 173a through 173m, connected to each other in daisy-chain. The 2-way optical repeaters 173 are optically connected to each other with the optical cables 12 and are electrically connected to more than one detector/transmitter 14, respectively. The detectors/transmitters 14 may be grouped by such as office sections or floors in a building, and each group of the detectors/transmitters 14 may be then wired by a simple DC line or an RS485/4222 wire for a 2-way optical repeater 173. The 2-way optical repeaters 173a through 173m may electrically connected to fire safety equipments 15 such as fire extinguishers, i.e. fire hydrants, sprinklers, or halogen extinguishers, or smoke ventilation system, i.e. dampers, fire doors, smoke shutters, smoke windows, evacuation guide light, etc.

The 2-way optical repeaters 173a through 173m deliver along with the upstream signal path to an antecedent 2-way optical repeater 173 or to the 3-way optical repeater 263 coupled to the concerned 2-way optical repeater 173, alarm signals which are delivered from a following 2-way optical repeater 173, or issued at detectors/transmitters 14, selectively according to embodiments, or combining the alarm signals received. Furthermore, the optical repeaters 173a, 173b through 173n deliver, along with the downstream signal path, control signals, which are transmitted from the 3-way optical repeater 263 coupled to the concerned 2-way optical repeater 173 or from an antecedent 2-way optical repeater 173, to a fire safety equipments 15, to which the control signals are destined, or to a following 2-way optical repeater 173.

The 2-way optical repeaters 173a through 173m of the invention may be optically connected other 2-way optical repeaters 173, and be electrically connected to the detectors/transmitters 14 or fire safety equipments 15. Thus, the 2-way optical repeater 173 may convert received optical signals first into electrical signals, process the converted signal, and then convert the processed electric signals into optical signals to be output.

According to the embodiments, the detectors/transmitters 14 may issue alarm signals optically, and be connected to the 2-way optical repeaters 173 with optical cables.

Figure 27:
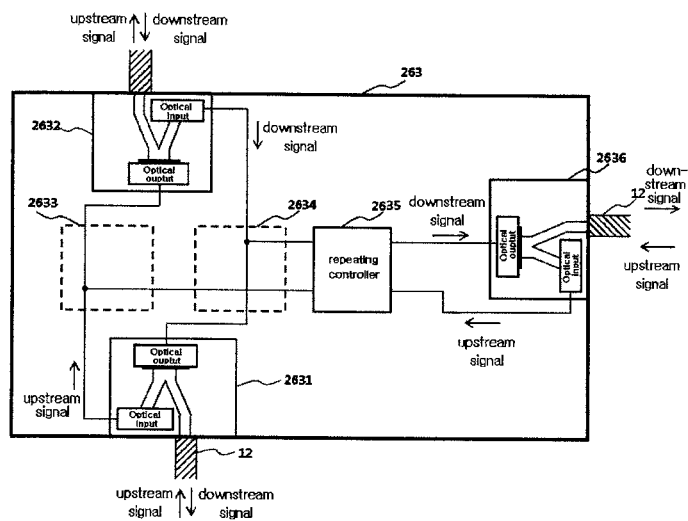
FIGS. 27 to 29 are block diagrams illustrating 3-way optical repeaters available for an R/GR type optically repeating fire alarm control system according to an embodiment of the present invention of FIG. 26.
Figure 28:
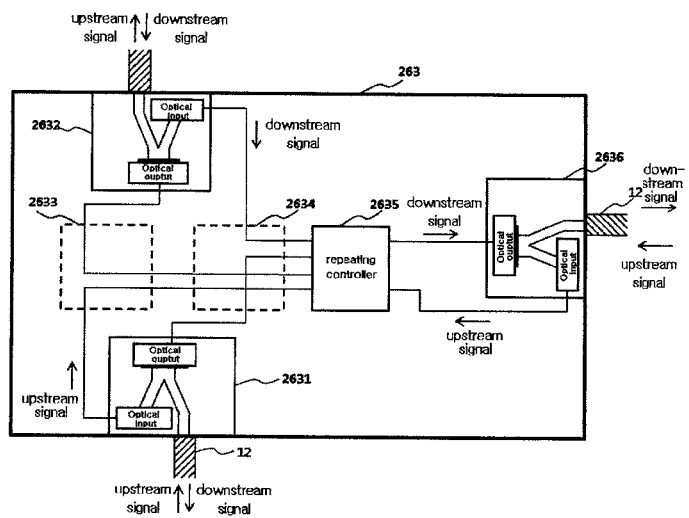
Figure 29:
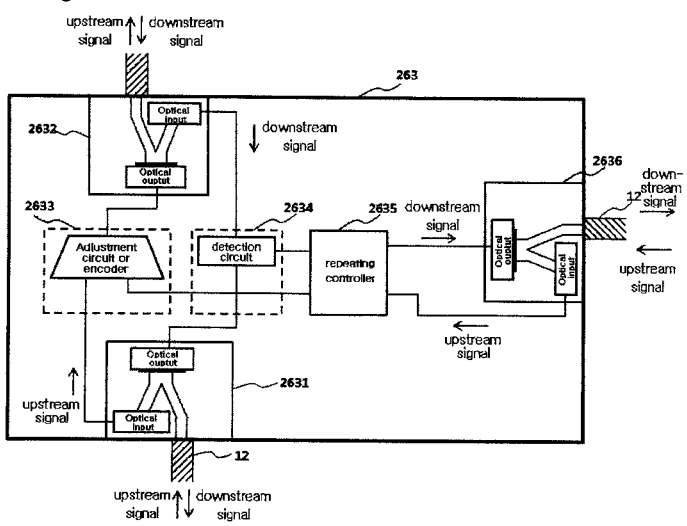

FIGS. 27 to 29 are block diagrams illustrating 3-way optical repeaters available for an R/GR type optically repeating fire alarm control system according to an embodiment of the present invention of FIG. 26.

Referring to FIGS. 27 to 29, the 3-way optical repeater 263 includes a first optical module 2631, a second optical module 2632, an upstream branch 2633, a downstream branch 2634, a repeating controller 2635 and a third optical module 2636. In FIGS. 27 to 29, the upstream branch 2633 and the downstream branch 2634 may have different configurations, while remaining elements in FIGS. 27 to 29 of the optical repeater 263 are substantially identical. Furthermore, the first optical module 2631, the second optical module 2632, the upstream branch 2633 and the downstream branch 2634 in FIGS. 27 to 29 are substantially identical to the first optical module 1731, the second optical module 1732, the upstream branch 1733 and the downstream branch 1734 in FIGS. 21 to 23, respectively, so that the description may be omitted.

The repeating controller 2635 determines whether the alarm signals from the 2-way optical repeater 173 via the optical cable 12 are pertinent or not, and then delivers the alarm signals to the upstream branch 2633. Furthermore, the repeating controller 2635 determines whether the control signal from the downstream branch 2634 regards the fire safety equipment 15 connected to the 2-way optical repeater 173, which is coupled to the concerned 3-way optical repeater 263, and when the control signal is related to the fire safety equipment 15 connected to the optical repeater 173, then deliver the control signal to the fire safety equipment 15.

Specifically, the optical input unit of the first optical module 2631 may receive upstream optical signals delivered via an optical cable from other optical repeater, and then convert the received upstream optical signals into electric upstream electric signals. The upstream branch 2633 may combine alarm signals transferred through the repeating controller 2635 originated at the detectors/transmitters 14, and the upstream electric signals converted at the optical input unit of first optical module 2631, and then deliver the combined upstream electric signals to the optical output unit of the second optical module 2632. The second optical module 2632 converts the delivered combined upstream electric signals into combined upstream optical signals to be output via another optical cable.

The third optical input port 2636, in its optical input unit, converts optical alarm signals from the 2-way optical repeater 173 into electric alarm signals to be transferred to the repeating controller 2635. The repeating controller 2635 determines whether the alarm signals from the 2-way optical repeater 173 via the third optical module 2636 are pertinent or not, and if affirmative, then delivers the alarm signals to the upstream branch 2633. Furthermore, the repeating controller 2635 determines whether the control signal from the downstream branch 2634 regards the fire safety equipment connected to the 2-way optical repeater 173, which is relayed by the concerned 3-way optical repeater 263, and when the control signal is related to the fire safety equipment connected to the concerned 2-way optical repeater 173, then deliver the control signal to the fire safety equipment. The third optical module 2636, in its optical output unit, converts the control signals into optical control signals to be output to the 2-way optical repeater 173.

The upstream branch 2633 may be implemented in varying fashions. Referring to FIG. 27, in some embodiments, the upstream branch 2633 may just be a wired tap, which connects two conductive lines. In this case, although the configuration of the upstream branch 2633 may be simple, collision may be occurred when alarm signals simultaneously arrive from detectors/transmitter 14 and the other optical repeater 263.

Referring to FIG. 28, in another embodiment, the upstream branch 2633 may be configured to electrically connect the optical input unit of the first optical module 2631 and the repeating controller 2635, and to electrically connect the repeating controller 2635 and the optical output unit of the second optical module 2632. In this case, upstream signals from other optical repeater 263 are delivered via wiring of the upstream branch 2633 to the repeating controller 2635 which combines the upstream electric signals and the alarm signals, so as to deliver the combined electric signals to the optical output unit of the second optical module 2632 via wiring of the upstream branch 2633.

Referring to FIG. 29, the upstream branch 2633 may be implemented as an adjustment circuit, which, for example when two alarm signals arrives at the same time from other 3-way optical repeaters 263 and the detector/transmitter 14, is capable of selectively outputting one signal before the other and delaying the other signal for avoiding collision. The upstream branch 2633, further, may be implemented as a packet encoder, which, for example, can encode a combined packet loading two alarm signals into one payload to be output. The downstream branch 2634 may a detection circuit to extract a control signal to be sent to the fire safety equipment that is connected to the concerned 3-way optical repeater 263 and the 2-way optical repeater 173.

Besides, the optical input unit of the second optical module 2632 receives downstream optical signals with which control signals originated at the R/GR fire alarm control panel 171 are delivered through an optical cable, and then converts the received downstream optical signals into downstream electrical signals. The downstream electric signal may be identical to the control signal originated at the R/GR fire alarm control panel 171. The downstream branch 2634 transfers the downstream electric signals to the repeating controller 2635 and the optical output unit of the first optical module 2631, respectively. The optical output unit of the first optical module 2631 converts the received downstream electric signals into downstream optical signals to be output through another optical cable 12.

The downstream branch 2634 may be implemented in varying fashions. Referring to FIG. 27, in some embodiments, the downstream branch 2634 may just be a wired tap. In this case, the control signals are directed to both of the optical output unit of the first optical module 2631 and the repeating controller 2635.

Referring to FIG. 28, according to additional embodiments, the downstream branch 2634 may be implemented to electrically connect the optical input unit of the second optical module 2632 and the repeating controller 2635, and to electrically connect the repeating controller 2635 and the optical output unit of the first optical module 2631. In this case, control signals among the downstream electric signals from antecedent optical repeater 263 are delivered via wiring of the downstream branch 2634 to the repeating controller 2635. When the repeating controller 2635 outputs accordingly processed control signals, the processed control signals are delivered to the optical output unit of the first optical module 2631 via wiring of the downstream branch 2634. The repeating controller 2635 may output the received control signals intact, or may output regenerated control signals by removing part related to the concerned optical repeater 263.

Referring to FIG. 29, the downstream branch 2634 may be implemented as a detection circuit, which, for example, may direct control signals to the repeating controller 2635 only when there exists any control signal corresponding to the concerned optical repeater 263 among the received control signals, otherwise directing the control signals to the optical output unit of the first optical module 2631.

The foregoing is illustrative of the present invention and is not to be construed as limiting thereof. Although a few example embodiments of this invention have been described, those skilled in the art will readily appreciate that many modifications are possible in the example embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims.

The invention is defined by the following claims, with equivalents of the claims to be included therein.

The invention claimed is:

1. An optical signal converter connecting multiple detectors/transmitters and an R/GR fire alarm control panel and connecting multiple fire safety equipments and the R/GR fire alarm control panel such that a plurality of optical signal converters including the optical signal converter be coupled in daisy-chain, the optical signal converter comprising:
   an upstream signal path for electrically combining an electric signal, which is electrically converted from an optical signal optically received from a next optical signal converter connected in the daisy-chain, and an alarm signal, which is originated from at least one of the multiple detectors/transmitters, so as to output an optical signal optically converted from the electrically combined signal;
   a downstream signal path for electrically converting an optical signal optically received from a previous optical signal converter connected in the daisy-chain into an electrically converted signal, and then for optically reconverting the electrically converted signal so as to output the optical signal to the next optical signal converter; and
   an I/O port connected to the upstream signal path and providing the alarm signal received from the at least one of the multiple detectors/transmitters to the upstream signal path, the I/O port further connected to the downstream signal path and externally outputting the electrically converted signal from the downstream signal path to at least of the multiple fire safety equipments,
   wherein the optical signal passing through the upstream signal path is eventually destined to the R/GR fire alarm control panel through the daisy-chain, and wherein the optical signal passing through the downstream signal path is originated from the R/GR fire alarm control panel,
   wherein the upstream signal path comprises:
      a first optical input port producing the electric signal electrically converted from the optical signal from the next optical signal converter connected in the daisy-chain;
      an upstream branch connected to the first optical input port and combining the electric signal received from the first optical input port and the alarm signal originated from the at least one of the multiple detectors/transmitters, so as to produce the electrically combined signal; and
      a first optical output port connected to the upstream branch and producing the optical signal optically converted from the electrically combined signal received from the upstream branch,
   wherein the upstream branch comprises a packet encoder for producing the electrically combined signal when the electric signal from the first optical input port and the alarm signal from the at least one of the multiple detectors/transmitters arrive simultaneously, the packet encoder outputting the electrically combined signal to the first optical output port,
   wherein the downstream signal path comprises:
      a second optical input port producing the electrically converted signal from the optical signal optically received from the previous optical signal converter connected in the daisy-chain;
      a downstream branch connected to the second optical input port and forking the electrically converted signal received from the second optical input port to the I/O port and a second optical output port; and
      the second optical output port connected to the downstream branch and optically converting the electrically converted signal received from the downstream branch to be output externally,
   wherein the downstream branch comprises a detection circuit detecting a control signal in the electrically converted signal from the second optical input port to be transmitted to one of the multiple fire safety equipments, the detection circuit outputting the control signal to the I/O port,
   wherein the I/O port comprises:
      an input port for receiving a differential alarm signal satisfying RS422 specification or a DC 24 V alarm signal from the multiple detectors/transmitters, and for converting to a single-ended alarm signal to be provided to the upstream signal path; and
      an output port for converting the electrically converted signal from the downstream signal path to a differential signal satisfying RS422 specification or a DC 24 V signal to be output externally, and
   wherein the R/GR fire alarm control panel comprises:
      an operation monitor monitoring whether signal lines connected to the R/GR alarm control panel are operational;
      an indicator comprising a display, LED lamps, or speakers to visually or aurally indicate an alarm status or an operation status;
      a network interface performing communications to and from a control center;
      a storage storing operation information; and
      a controller controlling the operation monitor, the indicator, the network interface, the storage, and the optical I/O port.

2. An optical signal repeater connecting multiple detectors/transmitters and an R/GR fire alarm control panel and connecting multiple fire safety equipments and the R/GR fire alarm control panel and with optical cables in daisy-chain, comprising:
   an upstream signal path for electrically combining an electric signal, which is electrically converted from an optical signal optically received from a next optical signal repeater connected in the daisy-chain, and an alarm signal, which is originated from at least one of the multiple detectors/transmitters, so as to output an optical signal optically converted from the electrically combined signal;
   a downstream signal path for electrically converting an optical signal optically received from a previous optical signal repeater connected in the daisy-chain into an electrically converted signal, and then for optically reconverting the electrically converted signal so as to output the optical signal to the next optical signal repeater; and
   a repeating controller connected to the upstream signal path and an I/O port between the upstream signal path and the I/O port, and providing the alarm signal received from the I/O port to the upstream signal path, the repeating controller further connected to the downstream signal path between the downstream signal path and the I/O port, and extracting a control signal in the electric signal received from the downstream signal path to be transmitted to the I/O port, wherein the I/O port provides the alarm signal received from the at least one of the multiple detectors/transmitters to the upstream signal path and externally outputs the control signal to corresponding fire safety equipments, and wherein the optical signal passing through the upstream signal path is eventually destined to the R/GR fire alarm control panel through the daisy-chain, and wherein the optical signal passing through the downstream signal path is originated from the R/GR fire alarm control panel, wherein the upstream signal path comprises:
 a first optical input port producing the electric signal electrically converted from the optical signal received from the next optical signal repeater connected in the daisy-chain;
 an upstream branch connected to the first optical port and combining the electric signal received from the first optical input port and the alarm signal originated from the at least one of the multiple detectors/transmitters, so as to produce the electrically combined signal; and
 a first optical output port connected to the upstream branch and producing the optical signal optically converted from the electrically combined signal received from the upstream branch, wherein the upstream branch comprises a packet encoder for producing the electrically combined signal when the electric signal from the first optical input port and the alarm signal from the detectors/transmitters arrive simultaneously, the packet encoder outputting the electrically combined signal to the first optical output port, wherein the downstream signal path comprises:
 a second optical input port producing the electrically converted signal from the optical signal optically received from the previous optical signal repeater connected in the daisy-chain;
 a downstream branch connected to the second optical input port and forking the electrically converted signal received from the second optical input port to the repeating controller and a second optical output port; and
 the second optical output port connected to the downstream branch and optically converting the electrically converted signal received from the downstream branch to be output externally, wherein the downstream branch comprises a detection circuit detecting a control signal in the electrically converted signal from the second optical input port to be transmitted to one of the multiple fire safety equipments, the detection circuit outputting the control signal to the repeating controller, wherein the I/O port comprises:
 an input port for receiving a differential alarm signal satisfying RS422 specification or a DC 24 V alarm signal from the multiple detectors/transmitters, and for converting to a single-ended alarm signal to be provided to the upstream signal path; and
 an output port for converting the electrically converted signal from the downstream signal path to a differential signal satisfying RS422 specification or a DC 24 V signal to be output externally, and wherein the R/GR fire alarm control panel comprises:
 an operation monitor monitoring whether signal lines connected to the R/GR alarm control panel are operational;
 an indicator comprising a display, LED lamps, or speakers to visually or aurally indicate an alarm status or an operation status;
 a network interface performing communications to and from a control Center;
 a storage storing operation information; and
 a controller controlling the operation monitor, the indicator, the network interface, the storage, and the optical I/O port.

3. An R/GR fire alarm control system comprising:
a plurality of detectors/transmitters for issuing alarm signals;
a plurality of fire safety equipments for operating under control signals;
a plurality of repeaters connected to the plurality of detectors/transmitters and the plurality of fire safety equipments;
a plurality of optical converters, connected to each other in daisy-chain, for optically transmitting the alarm signals upwardly and optically transmitting the control signals downwardly, and the plurality of optical converters being capable of electrically transacting the alarm signals and the control signals with respect to the plurality of the repeaters; and
an R/GR fire alarm control panel for receiving the alarm signals from one of the plurality of optical converters and for transmitting the control signals to one of the plurality of optical converters, wherein each of the plurality of optical converters comprises:
 an upstream signal path for electrically combining an electric signal, which is electrically converted from an optical signal optically received from a next optical converter connected in the daisy-chain, and an alarm signal, which is originated from at least one of the plurality of detectors/transmitters, so as to output an optical signal optically converted from the electrically combined signal to the R/GR fire alarm control panel;
 a downstream signal path for electrically converting an optical signal optically received from a previous optical converter connected in the daisy-chain into an electrically converted signal, and then for optically reconverting the electrically converted signal so as to output the optical signal to the next optical converter; and
 an I/O port connected to the upstream signal path and providing the alarm signal received from the at least one of the plurality of detectors/transmitters to the upstream signal path, the I/O port further connected to the downstream signal path and externally outputting the electrically converted signal received from the downstream signal path to at least one of the plurality of fire safety equipments, wherein the upstream signal path comprises:
 a first optical input port producing the electric signal electrically converted from the optical signal from the next optical converter connected in the daisy-chain;
 an upstream branch connected to the first optical input port and combining the electric signal received from the first optical input port and the alarm signal originated from the at least one of the plurality of detectors/transmitters, so as to produce the electrically combined signal; and a first optical output port connected to the upstream branch and producing the optical signal optically converted from the electrically combined signal from the upstream branch, wherein the upstream branch comprises a packet encoder for producing the electrically combined signal when the electric signal from the first optical input port and the alarm signals from the plurality of detectors/transmitters arrive simultaneously, the packet encoder outputting the electrically combined signal to the first optical output port, wherein the downstream signal path comprises:
  a second optical input port producing the electrically converted signal from the optical signal optically received from a previous optical converter connected in the daisy-chain;
  a downstream branch connected to the second optical input port and forking the electrically converted signal received from the second optical input port to the I/O port and a second optical output port; and
  the second optical output port connected to the downstream branch and optically converting the electrically converted signal received from the downstream branch to be output externally, and wherein the downstream branch comprises a detection circuit for detecting a control signal in the electrically converted signal from the second optical input port to be transmitted to one of the fire safety equipments, the detection circuit outputting the control signal to the I/O port, wherein the I/O port comprises:
  an input port for receiving a differential alarm signal satisfying RS422 specification or a DC 24 V alarm signal from the multiple detectors/transmitters, and for converting to a single-ended alarm signal to be provided to the upstream signal path; and
  an output port for converting the electrically converted signal from the downstream signal path to a differential signal satisfying RS422 specification or a DC 24 V signal to be output externally, and wherein the R/GR fire alarm control panel comprises:
  an operation monitor monitoring whether signal lines connected to the R/GR alarm control panel are operational;
  an indicator comprising a display, LED lamps, or speakers to visually or aurally indicate an alarm status or an operation status;
  a network interface performing communications to and from a control center;
  a storage storing operation information; and
  a controller controlling the operation monitor, the indicator, the network interface, the storage, and the optical I/O port.

4. The R/GR fire alarm control system of claim 3, further comprising:
  a single port optical converter optically coupled to the one of the plurality of optical converters and electrically coupled to the R/GR fire alarm control panel.

5. An R/GR fire alarm control system comprising:
  a plurality of detectors/transmitters for issuing alarm signals;
  a plurality of fire safety equipments for operating under control signals;
  a plurality of optical repeaters, connected to each other in daisy-chain and connected to the plurality of the detectors/transmitters and the plurality of fire safety equipments, the plurality of optical repeaters for optically transmitting the alarm signals upwardly and optically transmitting the control signals downwardly, and capable of electrically transacting the alarm signals with respect to the plurality of detectors/transmitters and the control signals with respect to the plurality of fire safety equipments; and
  an R/GR fire alarm control panel for receiving the alarm signals from one of the plurality of optical repeaters and for transmitting the control signals to one of the plurality of optical repeaters, wherein each of the plurality of optical repeaters comprises:
an upstream signal path for electrically combining an electric signal, which is electrically converted from an optical signal optically received from a next optical repeater connected in the daisy-chain, and an alarm signal, which is originated from at least one of the plurality of detectors/transmitters, so as to output an optical signal optically converted from the electrically combined signal to the R/GR fire alarm control panel;
a downstream signal path for electrically converting an optical signal optically received from a previous optical repeater connected in the daisy-chain into an electrically converted signal, and then for optically reconverting the electrically converted signal so as to output the optical signal to the next optical repeater; and
a repeating controller connected to the upstream signal path and an I/O port and providing the alarm signal received from the I/O port to the upstream signal path, the repeating controller further connected to the downstream signal path and extracting a control signal in the electric signal received from the downstream signal path to be transmitted to the I/O port, wherein the I/O port provides the alarm signal received from the at least one of the multiple detectors/transmitters to the upstream signal path and externally outputs the control signal to a corresponding fire safety equipment, and wherein the optical signal passing through the upstream signal path is eventually destined to the R/GR fire alarm control panel through the daisy-chain, and wherein the optical signal passing through the downstream signal path is originated from the R/GR fire alarm control panel, wherein the upstream signal path comprises:
  a first optical input port producing the electric signal electrically converted from the optical signal from the next optical signal repeater connected in the daisy-chain;
  an upstream branch connected to the first optical input port and combining the electric signal received from the first optical input port and the alarm signal originated from the at least one of the plurality of detectors/transmitters, so as to produce the electrically combined signal; and
  a first optical output port connected to the upstream branch and producing the optical signal optically converted from the electrically combined signal received from the upstream branch, wherein the upstream branch comprises a packet encoder for producing the electrically combined signal when the electric signal from the first optical input port and the alarm signal from the detectors/transmitters arrive simultaneously, the packet encoder outputting the electrically combined signal to the first optical output port, wherein the downstream signal path comprises:

a second optical input port producing the electrically converted signal from the optical signal optically received from a previous optical repeater connected in the daisy-chain;

a downstream branch connected to the second optical input port and forking the electrically converted signal received from the second optical input port to the repeating controller and a second optical output port; and the second optical output port connected to the downstream branch and optically converting the electrically converted signal received from the downstream branch to be output externally, wherein the downstream branch comprises a detection circuit for detecting a control signal in the electrically converted signal from the second optical input port to be transmitted to one of the plurality of fire safety equipments, the detection circuit outputting the control signal to the repeating controller, wherein the I/O port comprises:

an input port for receiving a differential alarm signal satisfying RS422 specification or a DC 24 V alarm signal from the multiple detectors/transmitters, and for converting to a single-ended alarm signal to be provided to the upstream signal path; and an output port for converting the electrically converted signal from the downstream signal path to a differential signal satisfying RS422 specification or a DC 24 V signal to be output externally, and wherein the R/GR fire alarm control panel comprises:

an operation monitor monitoring whether signal lines connected to the R/GR alarm control panel are operational;

an indicator comprising a display, LED lamps, or speakers to visually or aurally indicate an alarm status or an operation status;

a network interface performing communications to and from a control center;

a storage storing operation information; and a controller controlling the operation monitor, the indicator, the network interface, the storage, and the optical I/O port.

6. The R/GR fire alarm control system of claim 5, further comprising:

a single port optical converter optically coupled to the one of the plurality of optical repeaters and electrically coupled to the R/GR fire alarm control panel.

7. A 3-way optical repeater, connecting multiple detectors/transmitters or multiple fire safety equipments and an R/GR fire alarm control panel with optical cables in daisy-chain, comprising:

an upstream signal path for optically receiving a first upstream signal, which is eventually destined to the R/GR fire alarm control panel, electrically converting the first upstream signal, electrically combining the converted first upstream signal with an alarm signal originated from at least one of the multiple detectors/transmitters to yield a second upstream signal, and optically outputting the second upstream signal;

a downstream signal path for optically receiving a first downstream signal, which originates from the R/GR fire alarm control panel and is eventually destined to at least one of the multiple fire safety equipments, electrically converting the first downstream signal, extracting a control signal for the at least one of the multiple fire safety equipments, and optically outputting the first downstream signal after the extraction; and an optical I/O port for electrically converting an alarm signal, which originates from the multiple detectors/transmitters and is optically provided, to be provided to the upstream signal path, and for optically outputting the control signal extracted at the downstream signal path, wherein the upstream signal path comprises:

a first optical input port producing a first upstream electric signal electrically converted from the first upstream signal, which is optically received from a next 3-way optical repeater connected in the daisy-chain;

an upstream branch connected to the first optical input port and combining the first upstream electric signal received from the first optical input port and the alarm signal originated from the at least one of the multiple detectors/transmitters, so as to produce a second upstream electric signal; and a first optical output port connected to the upstream branch and producing the second upstream signal optically converted from the second upstream electric signal outputted from the upstream branch, wherein the upstream branch comprises a packet encoder for producing the electrically combined signal when the first upstream electric signal from the first optical input port and the alarm signal from the at least one of the multiple detectors/transmitters arrive simultaneously, the packet encoder outputting the electrically combined signal, as the second upstream electric signal, to the first optical output port, wherein the downstream signal path comprises:

a second optical input port producing a electrical signal from the signal optically received from a previous 3-way optical repeater connected in the daisy-chain;

a downstream branch connected to the second optical input port and forking the electrical signal received from the second optical input port to the optical I/O port and a second optical output port; and the second optical output port connected to the downstream branch and optically converting the electrical signal received from the downstream branch to be output externally, wherein the downstream branch comprises a detection circuit detecting a control signal in the electrical signal from the second optical input port to be transmitted to one of the multiple fire safety equipments, and the detection circuit outputting the control signal to the optical I/O port, wherein the I/O port comprises:

an input port for receiving a differential alarm signal satisfying RS422 specification or a DC 24 V alarm signal from the multiple detectors/transmitters, and for converting to a single-ended alarm signal to be provided to the upstream signal path; and an output port for converting the electrically converted signal from the downstream signal path to a differential signal satisfying RS422 specification or a DC 24 V signal to be output externally, and wherein the R/GR fire alarm control panel comprises:

an operation monitor monitoring whether signal lines connected to the R/GR alarm control panel are operational;

an indicator comprising a display, LED lamps, or speakers to visually or aurally indicate an alarm status or an operation status;

a network interface performing communications to and from a control center;

a storage storing operation information; and a controller controlling the operation monitor, the indicator, the network interface, the storage, and the optical I/O port.

8. A 3-way optical repeater, connecting multiple detectors/transmitters or multiple fire safety equipments and an R/GR fire alarm control panel with optical cables in daisy-chain, comprising:
- a first optical input port for optically receiving a first signal from a first 3-way optical repeater connected in the daisy-chain;
- a first optical output port for optically outputting a second signal to a second 3-way optical repeater connected in the daisy-chain;
- a second optical input port for optically receiving a third signal from the second 3-way optical repeater;
- a second optical output port for optically outputting a fourth signal to the first 3-way optical repeater;
- a third optical input port for optically receiving an alarm signal eventually destined to the R/GR fire alarm control panel;
- a third optical output port for optically outputting a control signal eventually destined to one of the multiple fire safety equipments; and
- a relaying part for electrically receiving the first signal and the alarm signal, which are optically received from the first optical input port and the third optical input port, respectively, and electrically converted, so as to electrically produce the second signal to be provided to the first optical output port, for electrically receiving the third signal, which is optically received from the second optical input port and is electrically converted, so as to extract the control signal from the third signal to provided to the third optical output port, and for producing the fourth signal, based on the third signal, to the second optical output port, so as to deliver the fourth signal to the first 3-way optical repeater, wherein the R/GR fire alarm control panel comprises:
- an operation monitor monitoring whether signal lines connected to the R/GR alarm control panel are operational;
- an indicator comprising a display, LED lamps, or speakers to visually or aurally indicate an alarm status or an operation status;
- a network interface performing communications to and from a control center:
- an optical I/O port;
- a storage storing operation information; and
- a controller controlling the operation monitor, the indicator, the network interface, the optical I/O port, and the storage, and wherein the I/O port comprises:
- an input port for receiving a differential alarm signal satisfying RS422 specification or a DC 24 V alarm signal from the multiple detectors/transmitters, and for converting to a single-ended alarm signal to be provided to the upstream signal path; and
- an output port for converting the electrically converted signal from the downstream signal path to a differential signal satisfying RS422 specification or a DC 24 V signal to be output externally.

9. An R/GR fire alarm control system comprising:
- a plurality of detectors/transmitters for issuing alarm signals;
- a plurality of fire safety equipments for operating under control signals;
- a plurality of 3-way optical repeaters, connected to each other in daisy chain through optical cables, for optically transmitting the alarm signals upwardly and for optically transmitting the control signals downwardly;
- a plurality of 2-way optical repeaters, connected to the respective 3-way optical repeater and connected to each other in the daisy-chain through the optical cables, among the plurality of detectors/transmitters or the plurality of fire safety equipments, for optically transmitting the alarm signals to a correspondingly connected 3-way optical repeater, and for optically transmitting the control signals to a correspondingly connected 3-way optical repeater; and
- an R/GR fire alarm control panel for electrically or optically receiving the alarm signals from one of the plurality of 3-way optical repeaters and for electrically or optically transmitting the control signals to one of the plurality of 3-way optical repeaters, wherein the plurality of 3-way optical repeaters, connecting the plurality of detectors/transmitters or the plurality of fire safety equipments and the R/GR fire alarm control panel with the optical cables in the daisy-chain, comprises:
- a first optical input port for optically receiving a first signal from a first 3-way optical repeater connected in the daisy-chain;
- a first optical output port for optically outputting a second signal to a second 3-way optical repeater connected in the daisy-chain;
- a second optical input port for optically receiving a third signal from the second 3-way optical repeater;
- a second optical output port for optically outputting a fourth signal to the first 3-way optical repeater;
- a third optical input port for optically receiving an alarm signal eventually destined to the R/GR fire alarm control panel;
- a third optical output port for optically outputting a control signal eventually destined to one of the multiple fire safety equipments; and
- a relaying part for electrically receiving the first signal and the alarm signal, which are optically received from the first optical input port and the third optical input port, respectively, and electrically converted, so as to electrically produce the second signal to be provided to the first optical output port, for electrically receiving the third signal, which is optically received from the second optical input port and is electrically converted, so as to extract the control signal from the third signal to provided to the third optical output port, and for producing the fourth signal, based on the third signal, to the second optical output port, so as to deliver the fourth signal to the first 3-way optical repeater, wherein each of the plurality of 2-way optical repeaters comprises an optical signal repeater connecting the plurality of detectors/transmitters or the plurality of fire safety equipments and the R/GR fire alarm control panel with the optical cables in the daisy-chain, the optical signal repeater comprising:
- an upstream signal path for electrically combining an electric signal, which is electrically converted from an optical signal optically received from a next optical signal repeater connected in the daisy-chain, and an alarm signal, which is originated from at least one of the multiple detectors/transmitters, so as to output an optical signal optically converted from the electrically combined signal;
- a downstream signal path for electrically converting an optical signal optically received from a previous optical signal repeater connected in the daisy-chain into an electrically converted signal, and then for optically reconverting the electrically converted signal so as to output the optical signal to the next optical signal repeater; and a repeating controller for providing the alarm signal from an I/O port to the upstream signal path and for extracting a control signal in the electric signal from the downstream signal path to be transmitted to the I/O port, wherein the repeating controller is connected to the I/O port, and the repeating controller is further connected to the upstream signal path and the downstream signal path, wherein the I/O port provides the alarm signal received from the at least one of the multiple detectors/transmitters to the upstream signal path and externally outputs the control signal to a corresponding fire safety equipment, and wherein the optical signal passing through the upstream signal path is eventually destined to the R/GR fire alarm control panel through the daisy-chain, and wherein the optical signal passing through the downstream signal path is originated from the R/GR fire alarm control panel, wherein the upstream signal path comprises:
a first optical input port producing the electric signal electrically converted from the optical signal from the next optical signal repeater connected in the daisy-chain;
an upstream branch combining the electric signal from the first optical input port and the alarm signal originated from the at least one of the multiple detectors/transmitters, so as to produce the electrically combined signal; and
a first optical output port producing the optical signal optically converted from the electrically combined signal from the upstream branch, wherein the upstream branch comprises a packet encoder for producing the electrically combined signal when the first upstream electric signal from the first optical input port and the alarm signal from the at least one of the multiple detectors/transmitters arrive simultaneously, the packet encoder outputting the electrically combined signal to the first optical output port, wherein the downstream signal path comprises:
a second optical input port producing the electrically converted signal from the optical signal optically received from the previous optical signal repeater connected in the daisy-chain; and
a downstream branch forking the electrically converted signal from the second optical input port to the repeating controller and a second optical output port; and
the second optical output port optically converting the electrically converted signal from the downstream branch to be output externally, wherein the downstream branch comprises a detection circuit detecting a control signal in the electrically converted signal from the second optical input port to be transmitted to one of the multiple fire safety equipments, the detection circuit outputting the control signal to the repeating controller, wherein the I/O port comprises:
an input port for receiving a differential alarm signal satisfying RS422 specification or a DC 24 V alarm signal from the multiple detectors/transmitters, and for converting to a single-ended alarm signal to be provided to the upstream signal path; and
an output port for converting the electrically converted signal from the downstream signal path to a differential signal satisfying RS422 specification or a DC 24 V signal to be output externally, and wherein the R/GR fire alarm control panel comprises:
an operation monitor monitoring whether signal lines connected to the R/GR alarm control panel are operational;
an indicator comprising a display, LED lamps, or speakers to visually or aurally indicate an alarm status or an operation status;
a network interface performing communications to and from a control center;
a storage storing operation information; and
a controller controlling the operation monitor, the indicator, the network interface, the storage, and the optical I/O port.

10. The R/GR fire alarm control system of claim 9, further comprising:
a single port optical converter optically coupled to the one of the 3-way optical repeaters and electrically coupled to the R/GR fire alarm control panel.

11. An optical signal converter, connecting multiple detectors/transmitters or multiple fire safety equipments and an R/GR fire alarm control panel in daisy-chain using optical cables, the optical signal converter comprising:
a first optical module for receiving an upstream optical signal from a next optical signal converter connected in the daisy-chain to be converted into an upstream electric signal, for receiving a downstream electric signal to be converted into a downstream optical signal, and for outputting the downstream optical signal to the next optical signal converter;
a second optical module for receiving the downstream optical signal from a previous optical signal converter connected in the daisy-chain to be converted into the downstream electric signal, for receiving a combined upstream electric signal to be converted into a combined upstream optical signal, and for outputting the combined upstream optical signal to the previous optical signal converter;
an upstream branch for electrically combining the upstream electric signal from the first optical module and the alarm signal originated from the multiple detectors/transmitters, so as to produce the combined upstream electric signal; and
a downstream branch for providing the downstream electric signal from the second optical module to an I/O port and the first optical module, wherein the I/O port provides the alarm signal received from the multiple detectors/transmitters to the upstream branch and for externally outputting the downstream electric signal, wherein the upstream branch comprises a packet encoder for producing the combined upstream electric signal to be outputted as the combined upstream electric signal, when the upstream electric signal from the first optical module and the alarm signal from the multiple detectors/transmitters arrive simultaneously, the packet encoder outputting the electrically combined signal, as the second upstream electric signal, to the first optical output port, wherein the downstream branch comprises a detection circuit detecting a control signal in the downstream electric signal from the second optical module to be transmitted to one of the multiple fire safety equipments, the detection circuit outputting the control signal to the I/O port,
wherein the I/O port comprises:
an input port for receiving a differential alarm signal satisfying RS422 specification or a DC 24 V alarm signal from the multiple detectors/transmitters, and for converting to a single-ended alarm signal to be provided to the upstream signal path; and
an output port for converting the electrically converted signal from the downstream signal path to a differential signal satisfying RS422 specification or a DC 24 V signal to be output externally, and
wherein the R/GR fire alarm control panel comprises:
an operation monitor monitoring whether signal lines connected to the R/GR alarm control panel are operational;
an indicator comprising a display, LED lamps, or speakers to visually or aurally indicate an alarm status or an operation status;
a network interface performing communications to and from a control center:
a storage storing operation information; and
a controller controlling the operation monitor, the indicator, the network interface, the storage, and the optical I/O port.

12. An optical repeater, connecting multiple detectors/transmitters or multiple fire safety equipments and an R/GR fire alarm control panel in daisy-chain using optical cables, comprising:
a first optical module for receiving an upstream optical signal from a next optical repeater connected in the daisy-chain to be converted into an upstream electric signal, for receiving a downstream electric signal to be converted into a downstream optical signal, and for outputting the downstream optical signal to the next optical repeater;
a second optical module for receiving the downstream optical signal from a previous optical repeater connected in the daisy-chain to be converted into the downstream electric signal, for receiving a combined upstream electric signal to be converted into a combined upstream optical signal, and for outputting the combined upstream optical signal to the previous optical repeater;
an upstream branch for electrically combining the upstream electric signal from the first optical module and the alarm signal originated from the multiple detectors/transmitters, so as to produce the combined upstream electric signal;
a downstream branch for providing the downstream electric signal from the second optical module to a repeating controller and the first optical module; and
a repeating controller for providing the received alarm signal to the upstream branch, and for extracting a control signal from the downstream electric signal; and
an I/O port for providing the alarm signal received from the multiple detectors/transmitters to the repeating controller, and for externally outputting the control signal provided from the repeating controller,
wherein the upstream branch comprises a packet encoder for producing the combined upstream electric signal to be outputted as the combined upstream electric signal, when the upstream electric signal from the first optical module and the alarm signal from the multiple detectors/transmitters arrive simultaneously, the packet encoder outputting the electrically combined signal, as the second upstream electric signal, to the first optical output port, wherein the I/O port comprises:
an input port for receiving a differential alarm signal satisfying RS422 specification or a DC 24 V alarm signal from the multiple detectors/transmitters, and for converting to a single-ended alarm signal to be provided to the upstream signal path; and
an output port for converting the electrically converted signal from the downstream signal path to a differential signal satisfying RS422 specification or a DC 24 V signal to be output externally, and
wherein the R/GR fire alarm control panel comprises:
an operation monitor monitoring whether signal lines connected to the R/GR alarm control panel are operational;
an indicator comprising a display, LED lamps, or speakers to visually or aurally indicate an alarm status or an operation status;
a network interface performing communications to and from a control center:
a storage storing operation information; and
a controller controlling the operation monitor, the indicator, the network interface, the storage, and the optical I/O port.

13. An optical repeater, connecting multiple detectors/transmitters or multiple fire safety equipments and an R/GR fire alarm control panel in daisy-chain using optical cables, comprising:
a first optical module for receiving an upstream optical signal from a next optical repeater connected in the daisy-chain to be converted into an upstream electric signal, for receiving a downstream electric signal to be converted into a downstream optical signal, and for outputting the downstream optical signal to the next optical repeater;
a second optical module for receiving the downstream optical signal from a previous optical repeater connected in the daisy-chain to be converted into the downstream electric signal, for receiving a combined upstream electric signal to be converted into a combined upstream optical signal, and for outputting the combined upstream optical signal to the previous optical repeater;
an upstream branch for electrically combining the upstream electric signal from the first optical module and the alarm signal originated from the multiple detectors/transmitters, so as to produce the combined upstream electric signal;
a downstream branch for providing the downstream electric signal from the second optical module to a repeating controller and the first optical module;
a repeating controller for providing the received alarm signal to the upstream branch, and for extracting a control signal from the downstream electric signal; and
a third optical module for optically receiving the alarm signal originated from the multiple detectors/transmitters, for electrically converting the alarm signal to be provided to the repeating controller, and for externally outputting the control signal provided from the repeating controller,
wherein the upstream branch comprises a packet encoder for producing the combined upstream electric signal to be outputted as the combined upstream electric signal, when the upstream electric signal from the first optical module and the alarm signal from the multiple detectors/transmitters arrive simultaneously, the packet encoder outputting the electrically combined signal, as the second upstream electric signal, to the first optical output port, wherein the R/GR fire alarm control panel comprises:
- an operation monitor monitoring whether signal lines connected to the R/GR alarm control panel are operational;
- an indicator comprising a display, LED lamps, or speakers to visually or aurally indicate an alarm status or an operation status;
- a network interface performing communications to and from a control Center;
- an optical I/O port;
- a storage storing operation information; and
- a controller controlling the operation monitor, the indicator, the network interface, the optical I/O port, and the storage, and wherein the I/O port comprises:
- an input port for receiving a differential alarm signal satisfying RS422 specification or a DC 24 V alarm signal from the multiple detectors/transmitters, and for converting to a single-ended alarm signal to be provided to the upstream signal path; and
- an output port for converting the electrically converted signal from the downstream signal path to a differential signal satisfying RS422 specification or a DC 24 V signal to be output externally.

14. The optical signal converter of claim 1, wherein the multiple fire safety equipments comprise fire extinguishers or a smoke ventilation system.

15. The optical signal converter of claim 1, wherein the multiple detectors/transmitters comprise detectors for fire, smoke, heat, or gas, or push-button call points that are activated by a direct action of a person.

* * * * *